United States Patent
Bin Sediq et al.

(10) Patent No.: US 12,101,265 B2
(45) Date of Patent: Sep. 24, 2024

(54) DUAL-CONNECTIVITY SINGLE UPLINK SCHEMES

(71) Applicant: Telefonaktiebolaget LM Ericsson (publ), Stockholm (SE)

(72) Inventors: Akram Bin Sediq, Kanata (CA); Mikael Wittberg, Uppsala (SE); Zhiming Yin, Danderyd (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 362 days.

(21) Appl. No.: 17/624,633

(22) PCT Filed: Jul. 26, 2019

(86) PCT No.: PCT/IB2019/056418
§ 371 (c)(1),
(2) Date: Jan. 4, 2022

(87) PCT Pub. No.: WO2021/019276
PCT Pub. Date: Feb. 4, 2021

(65) Prior Publication Data
US 2022/0271883 A1  Aug. 25, 2022

(51) Int. Cl.
*H04L 5/00* (2006.01)
(52) U.S. Cl.
CPC .......... *H04L 5/0035* (2013.01); *H04L 5/0048* (2013.01); *H04L 5/006* (2013.01)

(58) Field of Classification Search
CPC ..... H04L 5/0035; H04L 5/0048; H04L 5/006; H04L 5/0055; H04L 1/1887; H04L 5/001; H04L 1/1854; H04W 72/0446; H04W 76/16; H04W 72/1215; H04W 88/10
See application file for complete search history.

(56) References Cited

U.S. PATENT DOCUMENTS

| | | | | |
|---|---|---|---|---|
| 2011/0261721 | A1* | 10/2011 | Zhou | H04W 24/10 370/254 |
| 2018/0310282 | A1* | 10/2018 | Shi | H04L 5/0092 |
| 2019/0296881 | A1* | 9/2019 | Ang | H04W 72/0446 |

(Continued)

OTHER PUBLICATIONS

Cagenius et al., Simplifying the 5G Ecosystem by Reducing Architecture Options; Ericsson Technology Review; Nov. 30, 2018, consisting of 12 pages.

(Continued)

*Primary Examiner* — Hardikkumar D Patel
(74) *Attorney, Agent, or Firm* — Weisberg I.P. Law, P.A.

(57) ABSTRACT

A method and network node for dual connectivity for a wireless device are disclosed. According to one aspect, a method in a network node is provided for use in a dual connectivity mode to communicate with wireless devices (WDs), according to a first radio access technology (RAT), and to communicate with WDs according to a second RAT is provided. The method includes scheduling uplink and downlink signals to be transmitted and received by a first set of WDs such that the first set of WDs are operable to: receive downlink signals and transmit uplink (UL) signals using the first RAT only in even Transmission Time Intervals (TTIs) of the first RAT; and transmit uplink signals using the second RAT only in in UL TTIs of the second RAT that do not collide with even TTIs of the first RAT.

25 Claims, 24 Drawing Sheets

| CONNECTIVITY OPTION | CORE NETWORK | MASTER RAT | SECONDARY RAT | 3GPP TERM | 3GPP RELEASE |
|---|---|---|---|---|---|
| OPTION 1 | EPC | LTE | - | LTE | REL. 8 |
| OPTION 3 | EPC | LTE | NR | EN-DC | REL. 15, DEC 2017 |
| OPTION 2 | 5GC | NR | - | NR | REL. 15, JUNE 2018 |
| OPTION 4 | 5GC | NR | eLTE | NE-DC | REL. 15, MARCH 2019 |
| OPTION 5 | 5GC | eLTE | - | eLTE | REL. 15, JUNE 2018 |
| OPTION 7 | 5GC | eLTE | NR | NGEN-DC | REL. 15, MARCH 2019 |

(56) References Cited

U.S. PATENT DOCUMENTS

| | | | | |
|---|---|---|---|---|
| 2021/0076400 | A1* | 3/2021 | Zhang | H04L 27/2603 |
| 2022/0182212 | A1* | 6/2022 | Takeda | H04L 5/1469 |

OTHER PUBLICATIONS

Yilmaz et al., LTE-NR Tight-Interworking and the First Steps to 5G; Ericsson Research Blog; Nov. 21, 2017, consisting of 6 pages.

Wikipedia Contributors, Intermodulation; Wikipedia, The Free Encyclopedia, https://en.wikipedia.org/w/index.php?title=Intermodulation&oldid=853755554 (accessed Nov. 27, 2018), consisting of 6 pages.

3GPP TS 38.101-3 V15.4.0 (Dec. 2018) 3rd Generation Partnership Project; Technical Specification Group Radio Access Network; NR; User Equipment (UE) Radio Transmission and Reception; Part 3: Range 1 and Range 2 Interworking Operation With Other Radios (Release 15), consisting of 216 pages.

3GPP TS 38.214 V15.4.0 (Dec. 2018) 3rd Generation Partnership Project; Technical Specification Group Radio Access Network; NR; Physical Layer Procedures for Control (Release 15), consisting of 104 pages.

3GPP TS 36.213 V15.1.0 (Mar. 2018) 3rd Generation Partnership Project; Technical Specification Group Radio Access Network; Evolved Universal Terrestrial Radio Access (E-UTRA) Physical Layer Procedures (Release 15), consisting of 499 pages.

Sharetechnote, http://www.sharetechnote.com/html/LTE_TDD_Overview.html#Special_Slot_Usage; LTE Tdd Overview; Jun. 14, 2019, consisting of 11 pages.

Wikipedia Contributors, Harmonics (electrical power), Wikipedia, The Free Encyclopedia, https://en.wikipedia.org/w/index.php?title=Harmonics_(electrical_power)&oldid=892015214 (accessed Apr. 12, 2019), consisting of 5 pages.

International Search Report and Written Opinion dated Mar. 3, 2020 issued in PCT Application PCT/IB2019/056418, consisting of 12 pages.

Apple Inc., 3GPP TSG-RAN WG1 #89; R1-1708276; Title: Uplink Sharing in NSA Mode; Agenda Item: 7.1.8; Document for: Discussion/Decision; May 15-19, 2017, Hangzhou, P.R. China, consisting of 6 pages.

Intel Corporation, 3GPP TSG RAN WG1 Meeting #88; R1-1702714; Title: NR-LTE Coexistence in UL; Agenda Item: 8.1.8; Document for: Discussion and Decision; Feb. 13-17, 2017, Athens, Greece, consisting of 3 pages.

Intel Corporation, 3GPP TSG-RAN WG4 Meeting NR ad-hoc #3; R4-1709399; Title: NR NSA Single UL Transmissions: RAN1 Design Overview and Performance Impacts; Agenda Item: 3.3.2.1; Document for: Discussion; Sep. 18-21, 2017, Nagoya, Japan, consisting of 6 pages.

3GPP TR 38.804 V14.0.0 (Mar. 2017); 3rd Generation Partnership Project; Technical Specification Group Radio Access Network; Study on New Radio Access Technology; Radio Interface Protocol Aspects (Release 14), consisting of 57 pages.

Indian Office Action dated Jul. 7, 2022 issued in corresponding Indian Application No. 202247008967, consisting of 8 pages.

* cited by examiner

| CONNECTIVITY OPTION | CORE NETWORK | MASTER RAT | SECONDARY RAT | 3GPP TERM | 3GPP RELEASE |
|---|---|---|---|---|---|
| OPTION 1 | EPC | LTE | - | LTE | REL. 8 |
| OPTION 3 | EPC | LTE | NR | EN-DC | REL. 15, DEC 2017 |
| OPTION 2 | 5GC | NR | - | NR | REL. 15, JUNE 2018 |
| OPTION 4 | 5GC | NR | eLTE | NE-DC | REL. 15, MARCH 2019 |
| OPTION 5 | 5GC | eLTE | - | eLTE | REL. 15, JUNE 2018 |
| OPTION 7 | 5GC | eLTE | NR | NGEN-DC | REL. 15, MARCH 2019 |

FIG. 1

| CASE | RAN | FRAME (10 msec) | | | | | | | | | | | | | | | | | | | |
|---|---|---|---|---|---|---|---|---|---|---|---|---|---|---|---|---|---|---|---|---|---|
| | LTE | 0 | | 1 | | 2 | | 3 | | 4 | | 5 | | 6 | | 7 | | 8 | | 9 | |
| | NR | 0 | 1 | 2 | 3 | 4 | 5 | 6 | 7 | 8 | 9 | 10 | 11 | 12 | 13 | 14 | 15 | 16 | 17 | 18 | 19 |
| LEGACY EN-DC WD PATTERN | LTE | ↑↓ | | ↑↓ | | ↑↓ | | ↑↓ | | ↑↓ | | ↑↓ | | ↑↓ | | ↑↓ | | ↑↓ | | ↑↓ | |
| | NR | ↓ | ↓ | S | ↑ | ↓ | ↓ | S | ↑ | ↓ | ↓ | S | ↑ | ↓ | ↓ | S | ↑ | ↓ | ↓ | S | ↑ |
| PROPOSED EN-DC WD PATTERN | LTE | ↑↓ | | X | | ↑↓ | | X | | ↑↓ | | X | | ↑↓ | | X | | ↑↓ | | X | |
| | NR | ↓ | ↓ | S | ↑ | ↓ | ↓ | S | ↑ | ↓ | ↓ | S | ↑ | ↓ | ↓ | S | ↑ | ↓ | ↓ | S | ↑ |

↑UPLINK ↓DOWNLINK X NEITHER DOWNLINK NOR UPLINK

S SPECIAL SLOT

*FIG. 6*

| CASE | RAN | FRAME (10 msec) | | | | | | | | | | | | | | | | | | | |
|---|---|---|---|---|---|---|---|---|---|---|---|---|---|---|---|---|---|---|---|---|---|
| | LTE | 0 | | 1 | | 2 | | 3 | | 4 | | 5 | | 6 | | 7 | | 8 | | 9 | |
| | NR | 0 | 1 | 2 | 3 | 4 | 5 | 6 | 7 | 8 | 9 | 10 | 11 | 12 | 13 | 14 | 15 | 16 | 17 | 18 | 19 |
| LEGACY EN-DC WD PATTERN | LTE | ↑↓ | | ↑↓ | | ↑↓ | | ↑↓ | | ↑↓ | | ↑↓ | | ↑↓ | | ↑↓ | | ↑↓ | | ↑↓ | |
| | NR | ↓ | ↓ | ↓ | S | ↑ | ↓ | ↓ | ↓ | S | ↑ | ↓ | ↓ | ↓ | S | ↑ | ↓ | ↓ | ↓ | S | ↑ |
| PROPOSED EN-DC WD PATTERN | LTE | ↑↓ | | X | | ↑↓ | | X | | ↑↓ | | X | | ↑↓ | | X | | ↑↓ | | X | |
| | NR | ↓ | ↓ | ↓ | S | X | ↓ | ↓ | ↓ | S | X | ↓ | ↓ | ↓ | S | ↑ | ↓ | ↓ | ↓ | S | ↑ |
| PROPOSED EN-DC WD PATTERN 2 | LTE | X | | ↑↓ | | X | | ↑↓ | | X | | ↑↓ | | X | | ↑↓ | | X | | ↑↓ | |
| | NR | ↓ | ↓ | ↓ | Ṣ | ↑ | ↓ | ↓ | ↓ | S | ↑ | ↓ | ↓ | ↓ | S | X | ↓ | ↓ | ↓ | Ṣ | X |

↑UPLINK ↓DOWNLINK X NEITHER DOWNLINK NOR UPLINK

S SPECIAL SLOT Ṣ SPECIAL SLOT WITHOUT UPLINK

FIG. 7

| CASE | RAN | FRAME (10 msec) | | | | | | | | | | | | | | | | | | | |
|---|---|---|---|---|---|---|---|---|---|---|---|---|---|---|---|---|---|---|---|---|---|
| | LTE | 0 | | 1 | | 2 | | 3 | | 4 | | 5 | | 6 | | 7 | | 8 | | 9 | |
| | NR | 0 | 1 | 2 | 3 | 4 | 5 | 6 | 7 | 8 | 9 | 10 | 11 | 12 | 13 | 14 | 15 | 16 | 17 | 18 | 19 |
| LEGACY EN-DC WD PATTERN | LTE | ↑↓ | | ↑↓ | | ↑↓ | | ↑↓ | | ↑↓ | | ↑↓ | | ↑↓ | | ↑↓ | | ↑↓ | | ↑↓ | |
| | NR | ↓ | ↓ | ↓ | S | ↑ | ↓ | ↓ | S | ↑ | ↑ | ↓ | ↓ | ↓ | S | ↑ | ↓ | ↓ | S | ↑ | ↑ |
| PROPOSED EN-DC WD PATTERN 1 | LTE | ↑↓ | | X | | ↑↓ | | X | | ↑↓ | | X | | ↑↓ | | X | | ↑↓ | | X | |
| | NR | ↓ | ↓ | ↓ | S | X | ↓ | ↓ | S | X | X | ↓ | ↓ | ↓ | S | ↑ | ↓ | ↓ | S | ↑ | ↑ |
| PROPOSED EN-DC WD PATTERN 2 | LTE | X | | ↑↓ | | X | | ↑↓ | | X | | ↑↓ | | X | | ↑↓ | | X | | ↑↓ | |
| | NR | ↓ | ↓ | S̸ | ↑ | ↓ | ↓ | S̸ | ↑ | ↑ | ↓ | ↓ | ↓ | S | X | ↓ | ↓ | S | X | X | |

↑ UPLINK  ↓ DOWNLINK  X NEITHER DOWNLINK NOR UPLINK

S SPECIAL SLOT  S̸ SPECIAL SLOT WITHOUT UPLINK

FIG. 10

| CASE | RAN | FRAME (10 msec) | | | | | | | | | | | | | | | | | | | |
|---|---|---|---|---|---|---|---|---|---|---|---|---|---|---|---|---|---|---|---|---|---|
| | LTE | 0 | | 1 | | 2 | | 3 | | 4 | | 5 | | 6 | | 7 | | 8 | | 9 | |
| | NR | 0 | 1 | 2 | 3 | 4 | 5 | 6 | 7 | 8 | 9 | 10 | 11 | 12 | 13 | 14 | 15 | 16 | 17 | 18 | 19 |
| LEGACY EN-DC WD PATTERN | LTE | ↑↓ | | ↑↓ | | ↑↓ | | ↑↓ | | ↑↓ | | ↑↓ | | ↑↓ | | ↑↓ | | ↑↓ | | ↑↓ | |
| | NR | ↓ | ↓ | ↓ | S | ↑ | ↑ | ↓ | ↓ | ↓ | ↓ | ↓ | ↓ | S | ↑ | ↑ | ↓ | ↓ | ↓ | ↓ | ↓ |
| PROPOSED EN-DC WD PATTERN 1 | LTE | ↑↓ | | X | | ↑↓ | | X | | ↑↓ | | X | | ↑↓ | | X | | ↑↓ | | X | |
| | NR | ↓ | ↓ | ↓ | S | X | X | ↓ | ↓ | ↓ | ↓ | ↓ | ↓ | S | ↑ | ↑ | X | X | X | ↓ | |
| PROPOSED EN-DC WD PATTERN 2 | LTE | X | | ↑↓ | | X | | ↑↓ | | X | | ↑↓ | | X | | ↑↓ | | X | | ↑↓ | |
| | NR | ↓ | ↓ | ↓ | S | ↑ | ↑ | X | X | X | ↓ | ↓ | ↓ | ↓ | S | X | X | ↓ | ↓ | ↓ | ↓ |

↑ UPLINK ↓ DOWNLINK X NEITHER DOWNLINK NOR UPLINK

S SPECIAL SLOT $\mathbb{S}$ SPECIAL SLOT WITHOUT UPLINK

◯ DOWNLINK IS NOT POSSIBLE SINCE REQUIRED K1 IS > 15

FIG. 11

| CASE | RAN | FRAME (10 msec) | | | | | | | | | | | | | | | | | | | |
|---|---|---|---|---|---|---|---|---|---|---|---|---|---|---|---|---|---|---|---|---|---|
| | LTE | 0 | | 1 | | 2 | | 3 | | 4 | | 5 | | 6 | | 7 | | 8 | | 9 | |
| | NR | 0 | 1 | 2 | 3 | 4 | 5 | 6 | 7 | 8 | 9 | 10 | 11 | 12 | 13 | 14 | 15 | 16 | 17 | 18 | 19 |
| LEGACY EN-DC WD PATTERN | LTE | ↓ | | S | | ↑ | | ↓ | | ↓ | | ↓ | | S | | ↑ | | ↓ | | ↓ | |
| | NR | ↓ | ↓ | ↓ | S | ↑ | ↑ | ↓ | ↓ | ↓ | ↓ | ↓ | ↓ | S | ↑ | ↑ | ↓ | ↓ | ↓ | ↓ | ↓ |
| PROPOSED EN-DC WD PATTERN 1 | LTE | ↓ | | S | | X | | ↓ | | X | | X | | X | | ↑ | | X | | ↓ | |
| | NR | ↓ | ↓ | ↓ | S | ↑ | ↑ | X | X | X | ↓ | ↓ | ↓ | ↓ | S | X | X | ↓ | ↓ | ↓ | ↓ |
| PROPOSED EN-DC WD PATTERN 2 | LTE | X | | X | | ↑ | | X | | ↓ | | ↓ | | S | | X | | ↓ | | X | |
| | NR | ↓ | ↓ | ↓ | S | X | X | ↓ | ↓ | ↓ | ↓ | ↓ | ↓ | S | ↑ | ↑ | X | X | X | ↓ | |

↑ UPLINK ↓ DOWNLINK ✗ NO DOWNLINK X NEITHER DOWNLINK NOR UPLINK
S SPECIAL SLOT/SUBFRAME Ṡ SPECIAL SLOT WITHOUT UPLINK
◯ DOWNLINK IS NOT POSSIBLE SINCE REQUIRED K1 IS > 15

FIG. 12

| CASE | RAN | FRAME (10 msec) | | | | | | | | | | | | | | | | | | | |
|---|---|---|---|---|---|---|---|---|---|---|---|---|---|---|---|---|---|---|---|---|
| | LTE | 0 | | 1 | | 2 | | 3 | | 4 | | 5 | | 6 | | 7 | | 8 | | 9 |
| | NR | 0 | 1 | 2 | 3 | 4 | 5 | 6 | 7 | 8 | 9 | 10 | 11 | 12 | 13 | 14 | 15 | 16 | 17 | 18 | 19 |
| LEGACY EN-DC WD PATTERN | LTE | ↓ | | S | | ↑ | | ↑ | | ↓ | | ↓ | | S | | ↑ | | ↑ | | ↓ |
| | NR | ↓ | ↓ | S | ↑ | ↓ | ↓ | S | ↑ | ↓ | ↓ | S | ↑ | ↓ | ↓ | ↓ | ↑ | ↓ | ↓ | S | ↑ |
| PROPOSED EN-DC WD PATTERN | LTE | ↓ | | S | | ↑ | | ↑ | | ↓ | | ↓ | | S | | ↑ | | ↑ | | ↓ |
| | NR | ↓ | ↓ | S | ⓤ | ↓ | ↓ | $ | X | ↓ | ↓ | S | ↑ | ↓ | ↓ | ↓ | X | ↓ | ↓ | ↓ | ↑ |

↑ UPLINK ↓ DOWNLINK X NEITHER DOWNLINK NOR UPLINK

S SPECIAL SLOT $ SPECIAL SLOT WITHOUT UPLINK

ⓤ UPLINK NR IS POSSIBLE AS LONG AS WD IS NOT CONFIGURED WITH LTE SRS IN SUBFRAME 1

FIG. 13

| CASE | RAN | FRAME (10 msec) | | | | | | | | | | | | | | | | | | | |
|---|---|---|---|---|---|---|---|---|---|---|---|---|---|---|---|---|---|---|---|---|---|
| | LTE | 0 | | 1 | | 2 | | 3 | | 4 | | 5 | | 6 | | 7 | | 8 | | 9 | |
| | NR | 0 | 1 | 2 | 3 | 4 | 5 | 6 | 7 | 8 | 9 | 10 | 11 | 12 | 13 | 14 | 15 | 16 | 17 | 18 | 19 |
| LEGACY EN-DC WD PATTERN | LTE | ↓ | | S | | ↑ | | ↓ | | ↓ | | ↓ | | S | | ↑ | | ↓ | | ↓ | |
| | NR | ↓ | ↓ | S | ↑ | ↓ | ↓ | S | ↑ | ↓ | ↓ | S | ↑ | ↓ | ↓ | ↓ | ↑ | ↓ | ↓ | S | ↑ |
| PROPOSED EN-DC WD PATTERN | LTE | ↓ | | S | | ↑ | | ↓ | | ↓ | | ↓ | | S | | ↑ | | ↓ | | ↓ | |
| | NR | ↓ | ↓ | S | (↑) | ↓ | ↓ | S | ↑ | ↓ | ↓ | S | ↑ | ↓ | ↓ | S̲ | X | ↓ | ↓ | S | ↑ |

↑ UPLINK ↓ DOWNLINK X NEITHER DOWNLINK NOR UPLINK

S SPECIAL SLOT S̲ SPECIAL SLOT WITHOUT UPLINK (↑) UPLINK NR IS POSSIBLE AS LONG AS WD IS NOT CONFIGURED WITH LTE SRS IN SUBFRAME 1

*FIG. 14*

| CASE | RAN | FRAME (10 msec) | | | | | | | | | | | | | | | | | | | |
|---|---|---|---|---|---|---|---|---|---|---|---|---|---|---|---|---|---|---|---|---|---|
| | LTE | 0 | | 1 | | 2 | | 3 | | 4 | | 5 | | 6 | | 7 | | 8 | | 9 | |
| | NR | 0 | 1 | 2 | 3 | 4 | 5 | 6 | 7 | 8 | 9 | 10 | 11 | 12 | 13 | 14 | 15 | 16 | 17 | 18 | 19 |
| LEGACY EN-DC WD PATTERN | LTE | ↑↓ | | ↑↓ | | ↑↓ | | ↑↓ | | ↑↓ | | ↑↓ | | ↑↓ | | ↑↓ | | ↑↓ | | ↑↓ | |
| | NR | ↓ | ↓ | ↓ | S | ↑ | ↓ | ↓ | ↓ | S | ↑ | ↓ | ↓ | ↓ | S | ↑ | ↓ | ↓ | ↓ | S | ↑ |
| PROPOSED EN-DC WD PATTERN 1 | LTE | ↑↓ | | ⇧↓ | | ↑↓ | | ⇧↓ | | ↑↓ | | ⇧↓ | | ↑↓ | | ⇧↓ | | ↑↓ | | ⇧↓ | |
| | NR | ↓ | ↓ | ↓ | S | ⇧ | ↓ | ↓ | ↓ | Ş | ⇧ | ↓ | ↓ | ↓ | S | ↑ | ↓ | ↓ | ↓ | S | ↑ |
| PROPOSED EN-DC WD PATTERN 2 | LTE | ⇧↓ | | ↑↓ | | ⇧↓ | | ↑↓ | | ⇧↓ | | ↑↓ | | ⇧↓ | | ↑↓ | | ⇧↓ | | ↑↓ | |
| | NR | ↓ | ↓ | ↓ | S | ↑ | ↓ | ↓ | ↓ | S | ↑ | ↓ | ↓ | ↓ | ↓ | ⇧ | ↓ | ↓ | ↓ | Ş | ⇧ |

↑ UPLINK ↓ DOWNLINK ⇧ PUCCH ONLY

S SPECIAL SLOT Ş SPECIAL SLOT WITHOUT UPLINK EXCEPT PUCCH

*FIG. 16*

| CASE | RAN | FRAME (10 msec) | | | | | | | | | | | | | | | | | | | |
|---|---|---|---|---|---|---|---|---|---|---|---|---|---|---|---|---|---|---|---|---|---|
| | LTE | 0 | | 1 | | 2 | | 3 | | 4 | | 5 | | 6 | | 7 | | 8 | | 9 | |
| | NR | 0 | 1 | 2 | 3 | 4 | 5 | 6 | 7 | 8 | 9 | 10 | 11 | 12 | 13 | 14 | 15 | 16 | 17 | 18 | 19 |
| LEGACY EN-DC WD PATTERN | LTE | ↑↓ | | ↑↓ | | ↑↓ | | ↑↓ | | ↑↓ | | ↑↓ | | ↑↓ | | ↑↓ | | ↑↓ | | ↑↓ | |
| | NR | ↓ | ↓ | ↓ | S | ↑ | ↓ | ↓ | S | ↑ | ↑ | ↓ | ↓ | ↓ | S | ↑ | ↓ | ↓ | S | ↑ | ↑ |
| PROPOSED EN-DC WD PATTERN 1 | LTE | ↑↓ | | ⇑↓ | | ↑↓ | | ⇑↓ | | ↑↓ | | ⇑↓ | | ↑↓ | | ⇑↓ | | ↑↓ | | ⇑↓ | |
| | NR | ↓ | ↓ | ↓ | S | ⇑ | ↓ | ↓ | S | ⇑ | ⇑ | ↓ | ↓ | ↓ | S | ↑ | ↓ | ↓ | S | ↑ | ↑ |
| PROPOSED EN-DC WD PATTERN 2 | LTE | ⇑↓ | | ↑↓ | | ⇑↓ | | ↑↓ | | ⇑↓ | | ↑↓ | | ⇑↓ | | ↑↓ | | ⇑↓ | | ↑↓ | |
| | NR | ↓ | ↓ | ↓ | S̲ | ↑ | ↓ | ↓ | S̲ | ↑ | ↑ | ↓ | ↓ | ↓ | S | ⇑ | ↓ | ↓ | S | ⇑ | ⇑ |

↑ UPLINK ↓ DOWNLINK ⇑ PUCCH ONLY

S SPECIAL SLOT S̲ SPECIAL SLOT WITHOUT UPLINK EXCEPT PUCCH

*FIG. 17*

| CASE | RAN | FRAME (10 msec) | | | | | | | | | | | | | | | | | | | |
|---|---|---|---|---|---|---|---|---|---|---|---|---|---|---|---|---|---|---|---|---|---|
| | LTE | 0 | | 1 | | 2 | | 3 | | 4 | | 5 | | 6 | | 7 | | 8 | | 9 | |
| | NR | 0 | 1 | 2 | 3 | 4 | 5 | 6 | 7 | 8 | 9 | 10 | 11 | 12 | 13 | 14 | 15 | 16 | 17 | 18 | 19 |
| LEGACY EN-DC WD PATTERN | LTE | ↑↓ | | ↑↓ | | ↑↓ | | ↑↓ | | ↑↓ | | ↑↓ | | ↑↓ | | ↑↓ | | ↑↓ | | ↑↓ | |
| | NR | ↓ | ↓ | ↓ | S | ↑ | ↑ | ↓ | ↓ | ↓ | ↓ | ↓ | ↓ | ↓ | S | ↑ | ↑ | ↓ | ↓ | ↓ | ↓ |
| PROPOSED EN-DC WD PATTERN 1 | LTE | ↑↓ | | ⇑↓ | | ↑↓ | | ⇑↓ | | ↑↓ | | ⇑↓ | | ↑↓ | | ⇑↓ | | ↑↓ | | ⇑↓ | |
| | NR | ↓ | ↓ | ↓ | S | ⇑ | ⇑ | ↓ | ↓ | ↓ | ↓ | ↓ | ↓ | ↓ | Ⓢ | ↑ | ↑ | ↓ | ↓ | ↓ | ↓ |
| PROPOSED EN-DC WD PATTERN 2 | LTE | ⇑↓ | | ↑↓ | | ⇑↓ | | ↑↓ | | ⇑↓ | | ↑↓ | | ⇑↓ | | ↑↓ | | ⇑↓ | | ↑↓ | |
| | NR | ↓ | ↓ | ↓ | Ⓢ | ↑ | ↑ | ↓ | ↓ | ↓ | ↓ | ↓ | ↓ | ↓ | S | ⇑ | ⇑ | ↓ | ↓ | ↓ | ↓ |

↑ UPLINK ↓ DOWNLINK ⇑ PUCCH ONLY

S SPECIAL SLOT Ⓢ SPECIAL SLOT WITHOUT UPLINK EXCEPT PUCCH

FIG. 18

| CASE | RAN | FRAME (10 msec) | | | | | | | | | | | | | | | | | | | |
|---|---|---|---|---|---|---|---|---|---|---|---|---|---|---|---|---|---|---|---|---|
| | LTE | 0 | | 1 | | 2 | | 3 | | 4 | | 5 | | 6 | | 7 | | 8 | | 9 |
| | NR | 0 | 1 | 2 | 3 | 4 | 5 | 6 | 7 | 8 | 9 | 10 | 11 | 12 | 13 | 14 | 15 | 16 | 17 | 18 | 19 |
| LEGACY EN-DC WD PATTERN | LTE | ↓ | | S | | ↑ | | ↓ | | ↓ | | ↓ | | S | | ↑ | | ↓ | | ↓ |
| | NR | ↓ | ↓ | ↓ | S | ↑ | ↑ | ↓ | ↓ | ↓ | ↓ | ↓ | ↓ | ↓ | S | ↑ | ↑ | ↓ | ↓ | ↓ | ↓ |
| PROPOSED EN-DC WD PATTERN 1 | LTE | ↓ | | S | | ⇑ | | ↓ | | ↓ | | ↓ | | Ṣ | | ↑ | | ↓ | | ↓ |
| | NR | ↓ | ↓ | ↓ | Ṣ | ↑ | ↑ | ↓ | ↓ | ↓ | ↓ | ↓ | ↓ | ↓ | S | ⇑ | ⇑ | ↓ | ↓ | ↓ | ↓ |
| PROPOSED EN-DC WD PATTERN 2 | LTE | ↓ | | Ṣ | | ↑ | | ↓ | | ↓ | | ↓ | | S | | ⇑ | | ↓ | | ↓ |
| | NR | ↓ | ↓ | ↓ | S | ⇑ | ⇑ | ↓ | ↓ | ↓ | ↓ | ↓ | ↓ | ↓ | Ṣ | ↑ | ↑ | ↓ | ↓ | ↓ | ↓ |

↑ UPLINK ↓ DOWNLINK ⇑ PUCCH ONLY Ṣ SPECIAL SUBFRAME WITHOUT UPLINK

S SPECIAL SLOT/SUBFRAME Ṣ SPECIAL SLOT WITHOUT UPLINK EXCEPT PUCCH

FIG. 19

| CASE | RAN | FRAME (10 msec) | | | | | | | | | | | | | | | | | | | |
|---|---|---|---|---|---|---|---|---|---|---|---|---|---|---|---|---|---|---|---|---|---|
| | LTE | 0 | | 1 | | 2 | | 3 | | 4 | | 5 | | 6 | | 7 | | 8 | | 9 | |
| | NR | 0 | 1 | 2 | 3 | 4 | 5 | 6 | 7 | 8 | 9 | 10 | 11 | 12 | 13 | 14 | 15 | 16 | 17 | 18 | 19 |
| LEGACY EN-DC WD PATTERN | LTE | ↓ | | S | | ↑ | | ↑ | | ↓ | | ↓ | | S | | ↑ | | ↑ | | ↓ | |
| | NR | ↓ | ↓ | S | ↑ | ↓ | ↓ | S | ↑ | ↓ | ↓ | S | ↑ | ↓ | ↓ | ↑ | ↓ | ↓ | S | ↑ | |
| PROPOSED EN-DC WD PATTERN | LTE | ↓ | | S | | ↑ | | ↑ | | ↓ | | ↓ | | S | | ↑ | | ↑ | | ↓ | |
| | NR | ↓ | ↓ | S | ⦿↑ | ↓ | ↓ | 𝕊 | ⇧ | ↓ | ↓ | S | ↑ | ↓ | ↓ | ⇧ | ↓ | ↓ | ↓ | ↑ | |

↑ UPLINK  ↓ DOWNLINK  ⇧ PUCCH ONLY

S SPECIAL SLOT  𝕊 SPECIAL SLOT WITHOUT UPLINK EXCEPT PUCCH

⦿ UPLINK NR IS POSSIBLE AS LONG AS WD IS NOT CONFIGURED WITH LTE SRS IN SUBFRAME 1; OTHERWISE, PUCCH IS ONLY ALLOWED

FIG. 20

| CASE | RAN | FRAME (10 msec) | | | | | | | | | | | | | | | | | | | |
|---|---|---|---|---|---|---|---|---|---|---|---|---|---|---|---|---|---|---|---|---|---|
| | LTE | 0 | | 1 | | 2 | | 3 | | 4 | | 5 | | 6 | | 7 | | 8 | | 9 | |
| | NR | 0 | 1 | 2 | 3 | 4 | 5 | 6 | 7 | 8 | 9 | 10 | 11 | 12 | 13 | 14 | 15 | 16 | 17 | 18 | 19 |
| LEGACY EN-DC WD PATTERN | LTE | ↓ | | S | | ↑ | | ↓ | | ↓ | | ↓ | | S | | ↑ | | ↓ | | ↓ | |
| | NR | ↓ | ↓ | S | ↑ | ↓ | ↓ | S | ↑ | ↓ | ↓ | S | ↑ | ↓ | ↓ | ↓ | ↑ | ↓ | ↓ | S | ↑ |
| PROPOSED EN-DC WD PATTERN | LTE | ↓ | | S | | ↑ | | ↓ | | ↓ | | ↓ | | S | | ↑ | | ↓ | | ↓ | |
| | NR | ↓ | ↓ | S | ⇧ | ↓ | ↓ | S | ↑ | ↓ | ↓ | S | ↑ | ↓ | ↓ | Ŝ | ⇧ | ↓ | ↓ | S | ↑ |

↑ UPLINK ↓ DOWNLINK ⇧ PUCCH ONLY

S SPECIAL SLOT Ŝ SPECIAL SLOT WITHOUT UPLINK EXCEPT PUCCH

⇧ UPLINK NR IS POSSIBLE AS LONG AS WD IS NOT CONFIGURED WITH LTE SRS IN SUBFRAME 1; OTHERWISE, PUCCH IS ONLY ALLOWED

FIG. 21

| CASE | RAN | FRAME (10 msec) | | | | | | | | | | | | | | | | | | | |
|---|---|---|---|---|---|---|---|---|---|---|---|---|---|---|---|---|---|---|---|---|---|
| | LTE | 0 | | 1 | | 2 | | 3 | | 4 | | 5 | | 6 | | 7 | | 8 | | 9 | |
| | NR | 0 | 1 | 2 | 3 | 4 | 5 | 6 | 7 | 8 | 9 | 10 | 11 | 12 | 13 | 14 | 15 | 16 | 17 | 18 | 19 |
| LEGACY EN-DC WD PATTERN | LTE | ↑↓ | | ↑↓ | | ↑↓ | | ↑↓ | | ↑↓ | | ↑↓ | | ↑↓ | | ↑↓ | | ↑↓ | | ↑↓ | |
| | NR | ↓ | ↓ | ↓ | S | ↑ | ↓ | ↓ | ↓ | S | ↑ | ↓ | ↓ | ↓ | S | ↑ | ↓ | ↓ | ↓ | S | ↑ |
| PROPOSED EN-DC WD PATTERN 1 | LTE | ↑↓ | | X | | ↑↓ | | X | | ↑↓ | | X | | ↑↓ | | X | | ↑↓ | | X | |
| | NR | ⇓ | ⇓ | ↓ | S | X | ⇓ | ↓ | ↓ | Ş | X | ↓ | ↓ | ⇓ | S | ↑ | ↓ | ⇓ | ⇓ | S | ↑ |
| PROPOSED EN-DC WD PATTERN 2 | LTE | X | | ↑↓ | | X | | ↑↓ | | X | | ↑↓ | | X | | ↑↓ | | X | | ↑↓ | |
| | NR | ↓ | ↓ | ⇓ | S | ↑ | ↓ | ⇓ | ⇓ | S | ↑ | ⇓ | ⇓ | ↓ | S | X | ⇓ | ↓ | ↓ | Ş | X |

⇑ UPLINK  ⇓ DOWNLINK  X NEITHER DOWNLINK NOR UPLINK

⇓ RESTRICTED DOWNLINK

S SPECIAL SLOT  Ş SPECIAL SLOT WITH NO UPLINK & RESTRICTED DOWNLINK

FIG. 22

| CASE | RAN | FRAME (10 msec) | | | | | | | | | | | | | | | | | | | |
|---|---|---|---|---|---|---|---|---|---|---|---|---|---|---|---|---|---|---|---|---|---|
| | LTE | 0 | | 1 | | 2 | | 3 | | 4 | | 5 | | 6 | | 7 | | 8 | | 9 | |
| | NR | 0 | 1 | 2 | 3 | 4 | 5 | 6 | 7 | 8 | 9 | 10 | 11 | 12 | 13 | 14 | 15 | 16 | 17 | 18 | 19 |
| LEGACY EN-DC WD PATTERN | LTE | ↑↓ | | ↑↓ | | ↑↓ | | ↑↓ | | ↑↓ | | ↑↓ | | ↑↓ | | ↑↓ | | ↑↓ | | ↑↓ | |
| | NR | ↓ | ↓ | ↓ | S | ↑ | ↓ | ↓ | S | ↑ | ↓ | ↓ | S | ↑ | ↓ | ↓ | S | ↑ | ↓ | ↓ | S | ↑ |
| PROPOSED EN-DC WD PATTERN 1 | LTE | ⇑↓ | | X | | ↑↓ | | X | | ↑↓ | | X | | ↑↓ | | X | | ⇑↓ | | X | |
| | NR | ↓ | ↓ | ↓ | S | X | ⇓ | ↓ | ↓ | Ṡ | X | ↓ | ↓ | ⇓ | S | ↑ | ↓ | ↓ | ↓ | S | ↑ |
| PROPOSED EN-DC WD PATTERN 2 | LTE | X | | ↑↓ | | X | | ⇑↓ | | X | | ⇑↓ | | X | | ↑↓ | | X | | ↑↓ | |
| | NR | ↓ | ↓ | ⇓ | S | ↑ | ↓ | ↓ | ↓ | S | ↑ | ↓ | ↓ | ↓ | S | X | ⇓ | ↓ | ↓ | Ṡ | X |

↑ UPLINK ↓ DOWNLINK  X NEITHER DOWNLINK NOR UPLINK

⇓ RESTRICTED DOWNLINK  ⇑ RESTRICTED UPLINK

S SPECIAL SLOT  Ṡ SPECIAL SLOT WITH NO UPLINK & RESTRICTED DOWNLINK

FIG. 23

| CASE | RAN | FRAME (10 msec) | | | | | | | | | | | | | | | | | | | |
|---|---|---|---|---|---|---|---|---|---|---|---|---|---|---|---|---|---|---|---|---|---|
| | LTE | 0 | | 1 | | 2 | | 3 | | 4 | | 5 | | 6 | | 7 | | 8 | | 9 | |
| | NR | 0 | 1 | 2 | 3 | 4 | 5 | 6 | 7 | 8 | 9 | 10 | 11 | 12 | 13 | 14 | 15 | 16 | 17 | 18 | 19 |
| LEGACY EN-DC WD PATTERN | LTE | ↑↓ | | ↑↓ | | ↑↓ | | ↑↓ | | ↑↓ | | ↑↓ | | ↑↓ | | ↑↓ | | ↑↓ | | ↑↓ | |
| | NR | ↓ | ↓ | ↓ | S | ↑ | ↓ | ↓ | S | ↑ | ↓ | ↓ | S | ↑ | ↓ | ↓ | S | ↑ | | | |
| PROPOSED EN-DC WD PATTERN 1 | LTE | ↑↓ | | ⇑↓ | | ↑↓ | | ⇑↓ | | ↑↓ | | ⇑↓ | | ↑↓ | | ⇑↓ | | ↑↓ | | ⇑↓ | |
| | NR | ⇓ | ⇓ | ↓ | S | ⇑ | ⇓ | ↓ | S | ⇑ | ↓ | ⇓ | S | ↑ | ↓ | ⇓ | S | ↑ | | | |
| PROPOSED EN-DC WD PATTERN 2 | LTE | ⇑↓ | | ↑↓ | | ⇑↓ | | ↑↓ | | ⇑↓ | | ↑↓ | | ⇑↓ | | ↑↓ | | ⇑↓ | | ↑↓ | |
| | NR | ↓ | ↓ | ⇓ | S | ↑ | ↓ | ⇓ | S | ↑ | ⇓ | ⇓ | S | ⇑ | ⇓ | ↓ | S | ⇑ | | | |

↑ UPLINK ↓ DOWNLINK X NEITHER DOWNLINK NOR UPLINK

⇓ RESTRICTED DOWNLINK ⇑ PUCCH ONLY

DUAL-CONNECTIVITY SINGLE UPLINK SCHEMES

CROSS-REFERENCE TO RELATED APPLICATION

This application is a Submission Under 35 U.S.C. § 371 for U.S. National Stage Patent Application of International Application Number: PCT/IB2019/056418, filed Jul. 26, 2019 entitled "DUAL-CONNECTIVITY SINGLE UPLINK SCHEMES," the entirety of which is incorporated herein by reference.

TECHNICAL FIELD

This disclosure is directed to wireless communication and in particular, to dual-connectivity single uplink (UL) schemes.

BACKGROUND

Third Generation Partnership Project (3GPP) standardization has specified six deployment options for Fifth Generation (5G) New Radio (NR). These options are summarized in FIG. 1. Three of these deployment options require dual connectivity between Long Term Evolution (LTE) or evolved LTE (eLTE) and NR, i.e., options 3, 4 and 7, in which user data can be carried through either LTE (or eLTE) and/or NR. Option 3 is called evolved universal terrestrial radio access (E-UTRA)—NR Dual Connectivity (EN-DC), where LTE is the master radio access technology (RAT), the Evolved Packet Core (EPC) is the core network, and NR is the secondary RAT. Option 4 is named NR-E-UTRA-Dual Connectivity (NE-DC), where NR is the master RAT, 5G Core (5GC) is the core network, and eLTE is the secondary RAT. Option 7 is known as NG-RAN E-UTRA-NR Dual Connectivity, where eLTE is the master RAT, 5GC is the core network, and NR is the secondary RAT.

The term LTE-NR DC is used herein to refer to any of options 3, 4 or 7.

Intermodulation Distortion (IMD)

Intermodulation distortion (IMD) includes amplitude modulation of signals containing two or more different frequencies, caused by nonlinearities or time variance in a system. The intermodulation between frequency components will form additional components at frequencies that are not just at harmonic frequencies (integer multiples) of either, like harmonic distortion, but also at the sum and difference frequencies of the original frequencies and at sums and differences of multiples of those frequencies.

When the wireless device transmits uplink (UL) signals in both LTE and NR simultaneously, there is a potential for IMD that may interfere with the reception of the downlink (DL) transmission in LTE and/or NR, depending on the LTE and NR UL and DL bandwidths. For instance, IMD generated by simultaneous UL in LTE and NR will interfere with LTE DL in the following bandwidth deployments:
  When LTE UL carrier is deployed in the range [1710 MHz, 1730];
  When LTE DL carrier in the range [1805 MHz, 1825 MHz]; and
  When NR is deployed in TDD band [3515 MHz, 3575 MHz].

The amount of degradation in DL LTE and/or DL NR due to IMD depends on the actual resource blocks (RB) allocated to the wireless device (WD) in the LTE uplink and the NR uplink, and may further depend on the actual transmission power in the UL in LTE and NR. IMD can cause severe degradation to the LTE DL and/or the NR DL.

Harmonics

A harmonic is a voltage or current or electromagnetic disturbance at a multiple of the fundamental frequency of the system, produced by the action of non-linear loads such as rectifiers, discharge lighting, or saturated magnetic devices. For example, LTE UL transmission can produce $2^{nd}$ order harmonics that can produce significant interference in part of the NR DL band in the following scenario:
  LTE UL carrier is deployed in the range [1750 MHz, 1770 MHz]
  NR is deployed in time division duplex (TDD) band [3500 MHz, 3600 MHz]
    The channels in [3500 MHz−margin1, 3540 MHz+ margin2] will be mainly impacted by the $2^{nd}$ harmonic, where margin1 and margin2 depend on the WD's hardware implementation Power Sharing The total power transmitted by the WD may be constrained due to regulation and/or the WD's hardware limitations. For example, 3GPP specifies the total maximum output power for EN-DC within a specified tolerance in 3GPP Technical Standard (TS) 38.101-3 V15.4.0 (2018 December), Section 6.2B.1, which can be either 23 dBm or 26 dBm, depending on the WD class and EN-DC band combination. Due to this constraint, the WD may share its uplink power between LTE and NR. Two schemes of UL power sharing are introduced in 3GPP: static power sharing and dynamic power sharing. Before explaining the difference between these two schemes, the following notations are adopted:
  $P_{LTE}$: maximum UL power on the LTE master cell group (MCG), which is semi-statically configured by radio resource control (RRC) signalling;
  $P_{NR}$: maximum UL power on the NR secondary cell group (SCG), which is semi-statically configured by RRC signalling;
  $P_{Total}^{EN-DC}$: total maximum UL power for EN-DC which depends on WD's power class and the EN-DC band combination; and
  $\hat{X}$: is the linear value of X, i.e., $$\hat{X} = 10^{\frac{X}{10}}.$$

When $\hat{P}_{LTE} + \hat{P}_{NR} \leq \hat{P}_{Total}^{EN-DC}$, dynamic and static power sharing are equivalent; LTE and NR UL power control algorithms are completely independent, and they use $P_{LTE}$ and $P_{NR}$ as the maximum UL power, respectively.

When $\hat{P}_{LTE} + \hat{P}_{NR} > \hat{P}_{Total}^{EN-DC}$:
  For dynamic power sharing:
  The WD performs the following:
  Calculate the UL power for the MCG in subframe $i_1$, $P_{MCG}(i_1)$,
  Calculate the UL power for the SCG in slot $i_2$, $P_{SCG}(i_2)$,
  If slot $i_2$ overlaps subframe $i_1$ and $\hat{P}_{MCG}(i_1) + \hat{P}_{SCG}(i_2) > \hat{P}_{Total}^{EN-DC}$
    Reduce $\hat{P}_{SCG}(i_2)$ so that $\hat{P}_{MCG}(i_1) + \hat{P}_{SCG}(i_2) \leq \hat{P}_{Total}^{EN-DC}$, while keeping the following in mind:
      The WD is allowed to drop the NR SCG transmission, i.e., set $\hat{P}_{SCG}(i_2)=0$, if $\hat{P}_{SCG}(i_2)$ reduction is more than an RRC configurable parameter, $X_{SCALE}$, which can be set to a value such as 6 dB (default) or 0 dB.

For static power sharing:
The WD is expected to be configured with a reference time division duplex (TDD) configuration by higher layer parameter tdm-PatternConfig-r15. In other words, the WD uses hybrid automatic repeat request (HARQ) timing case 1, i.e., the WD is not expected to transmit in a slot on the NR SCG when a corresponding subframe on the LTE MCG is an UL subframe in the reference TDD configuration.

Whether static or dynamic power sharing schemes are used, there is a potential penalty on the performance, because the available UL power can be potentially reduced in LTE and/or NR.

Single Uplink

One expected way to address the IMD issue and power-sharing penalty in LTE-NR DC is to use single uplink operation where the WD does not simultaneously transmit LTE and NR in the uplink. This can be ensured by coordination of uplink scheduling in LTE and NR. The coordination can be done in a static time-division multiplexing (TDM) manner where a set of subframes are reserved for UL LTE and another set of non-overlapping slots are reserved for UL NR. One such static coordination is proposed in 3GPP and it is called hybrid automatic repeat request (HARQ) timing case 1. In HARQ timing case 1, the network configures a WD in a frequency division duplex (FDD) LTE MCG with a reference TDD pattern using the RRC parameter tdm-PatternConfig-r15. The WD is not expected to transmit in a slot on the NR SCG when a corresponding subframe on the LTE MCG is an UL subframe in the reference TDD configuration. Since not all subframes are usable for UL in this case, the HARQ timing used in FDD (e.g., HARQ feedback for DL subframe n is sent on UL subframe n+4) can no longer work without modification to the HARQ timing. To address this, the HARQ timing may be modified in this case to allow the WD to "bundle" the HARQ feedback of multiple DL subframes into one UL subframe, the same way HARQ timing is defined for FDD Scell and TDD Pcell.

3GPP standard decisions also define HARQ timing case 2. In this case, single uplink is supported. In particular, the network avoids simultaneous NR and LTE UL scheduling. For this to work, LTE's base station (eNB) and NR's basestation (gNB) should coordinate their UL scheduling either statically or dynamically. Regardless whether static or dynamic coordination is used, it should respect the LTE HARQ timing, i.e., if a WD can transmit in DL in LTE subframe n, then it must be able to transmit LTE UL in subframe n+4, and vice versa. The standard does not specify how such coordination can happen and leaves it open to network's vendor implementation.

Implementation of HARQ timing case 1 as proposed in the 3GPP standards requires coordination of the network and the WD. It also requires activation by radio resource control (RRC) configuration, which may hinder dynamic activation and deactivation of this feature due to a WD's conditions or network load conditions.

SUMMARY

Some embodiments advantageously provide a method and system for dual-connectivity single uplink (UL) schemes.

Some embodiments implement HARQ timing case 2 in a way that does not require dynamic coordination between LTE and NR and does not require an implementation change of the WD or RRC configuration of the WD, i.e., it can be performed completely transparent to the WD. Some embodiments address both IMD and power sharing problems. In some embodiments, an even-odd time division duplex (TDD) pattern is implemented at the network side such that a subset of WDs will not transmit UL or DL in odd subframes in LTE and will not transmit UL in NR UL slots that collide with the even LTE subframes. Similarly, in some embodiments, another subset of WDs will not transmit UL or DL in even subframes in LTE and will not transmit UL in NR UL slots that collide with the odd LTE subframes. Other patterns are presented and/or suggested that can suit a wide range of deployment scenarios.

Some embodiments may have one or more of the following advantages:
Eliminating the problems of IMD and power sharing in a way fully transparent to the WD that does not require any implementation change at the WD, unlike HARQ timing case 1 specified in 3GPP;
Full utilization of LTE and NR bandwidth when there is more than one active WD; and
Ability to adapt the solution depending on the WD's and network's conditions without the need of RRC configuration that is required by HARQ timing case 1.

According to one aspect, a method in a network node for use in a dual connectivity mode to communicate with wireless devices, WDs, according to a first radio access technology, RAT, and to communicate with WDs according to a second RAT is provided. The method includes scheduling uplink and downlink signals to be transmitted and received by a first set of WDs such that the first set of WDs are operable to: receive downlink signals and transmit uplink signals using the first RAT only in even Transmission Time Intervals (TTIs) of the first RAT; and transmit uplink signals using the second RAT only in in UL TTIs of the second RAT that do not collide with even TTIs of the first RAT.

According to this aspect, in some embodiments, the first RAT is Long Term Evolution, LTE, and the second RAT is New Radio, NR. In some embodiments, a first group of WDs is scheduled according to a first pattern for uplink and downlink signaling and a second group of WDs is scheduled according to a second pattern for uplink and downlink signaling different from the first pattern. In some embodiments, the method further includes configuring a WD by radio resource control, RRC, signaling with up to N possible K1 values, N being an integer and K1 defined as a time gap in TTIs between a physical downlink shared channel, PDSCH, transmission and a reception hybrid automatic repeat request, HARQ, acknowledgment, ACK. In some embodiments, the method further includes restricting slots of the second RAT to have three consecutive TTIs with neither downlink nor uplink transmission. In some embodiments, at least one TTIs are prevented from being used for downlink or uplink signaling to avoid K1>15, K1 being defined as a time gap in units of TTIs between a physical downlink shared channel, PDSCH, transmission and a reception hybrid automatic repeat request, HARQ, acknowledgment, ACK. In some embodiments, an uplink signal using the second RAT is not scheduled in a TTI that overlaps another TTI, where a WD is not configured with a sounding reference signal of the first RAT. In some embodiments, uplink signals on the first RAT in odd TTIs are restricted to physical uplink control channel, PUCCH, only. In some embodiments, the method includes restricting downlink signaling to only parts of a frequency band where interference less than a threshold is expected from harmonics produced from any part of a used uplink frequency band. In some embodiments, the method includes restricting uplink signaling to only parts of a frequency band where low harmonic interference is expected to be generated that can harm any part of the used downlink frequency band. In some embodiments, the scheduling is applied per resource block. In some embodiments, the scheduling is activated based at least in part on a characteristic or condition of a WD. In some embodiments, the scheduling is deactivated based at least in part on a characteristic or condition of a WD.

According to another aspect, a network node for use in a dual connectivity mode to communicate with wireless devices, WDs, according to a first radio access technology, RAT, and to communicate with WDs according to a second RAT, the network node comprising processing circuitry configured to: schedule uplink and downlink signals to be transmitted and received by a first set of WDs such that the first set of WDs are operable to: receive downlink signals and transmit uplink signals using the first RAT only in even Transmission Time Intervals (TTIs) of the first RAT; and transmit uplink signals using the second RAT only in in UL slots of the second RAT that do not collide with even TTIs of the first RAT.

According to this aspect, in some embodiments, the first RAT is Long Term Evolution, LTE, and the second RAT is New Radio, NR. In some embodiments, a first group of WDs is scheduled with a first pattern for uplink and downlink signaling and a second group of WDs is scheduled with a second pattern for uplink and downlink signaling different from the first pattern. In some embodiments, the processing circuitry is further configured to configure a WD by radio resource control, RRC, signaling with up to 8 possible K1 values, K1 defined as a time gap in slots between a physical downlink shared channel, PDSCH, transmission and a reception hybrid automatic repeat request, HARQ, acknowledgment, ACK. In some embodiments, the processing circuitry is further configured to restrict downlink TTIs of the second RAT to produce three consecutive TTIs with neither downlink nor uplink transmission. In some embodiments, at least one TTI is prevented from being used for downlink or uplink signaling to avoid K1>15, K1 being defined as a time gap in units of TTIs between a physical downlink shared channel, PDSCH, transmission and a reception hybrid automatic repeat request, HARQ, acknowledgment, ACK. In some embodiments, an uplink signal using the second RAT is not configured when a WD is not configured with a sounding reference signal of the first RAT in a first subframe. In some embodiments, uplink signals on the first RAT in odd subframes are restricted to physical uplink control channel, PUCCH, only. In some embodiments, the processing circuitry is further configured to restrict downlink signaling to only parts of a frequency band where interference less than a threshold is expected from harmonics produces from any part of a used uplink frequency band. In some embodiments, the processing circuitry is further configured to restrict uplink signaling to only parts of a frequency band where harmonic interference is expected to be generated that can harm any part of the used downlink frequency band. In some embodiments, the scheduling is applied per resource block. In some embodiments, the scheduling is activated based at least in part on a characteristic of a WD. In some embodiments, the scheduling is deactivated based at least in part on a characteristic of a WD.

According to yet another aspect, a method in a network node for use in a dual connectivity mode to communicate with wireless devices, WDs, according to a first radio access technology, RAT, and to communicate with WDs according to a second RAT is provided. The method includes scheduling uplink and downlink signals to be transmitted and received by a first set of WDs such that the first set of WDs are operable to: receive downlink signals and transmit uplink signals using the first RAT only for a first three out of four TTIs of the first RAT; and transmit uplink signals using the second RAT only in uplink TTIs of the second RAT that do not collide with any one of the first three TTIs of the first RAT.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 1 is a table of connectivity options, options 3, 4 and 7 being dual connectivity options;

FIG. 6 is a diagram of an arrangement of slots and subframes for uplink and downlink transmissions for a first NR TDD pattern according to a first scenario of a first embodiment;

FIG. 7 is a diagram of an arrangement of slots and subframes for uplink and downlink transmissions for a second NR TDD pattern according to a second scenario of the first embodiment;

FIG. 10 is a diagram of slots and subframes according to a third scenario of a first embodiment described below;
FIG. 11 is a diagram of slots and subframes according to a fourth scenario of the first embodiment;
FIG. 12 is a diagram of slots and subframes according to a fifth scenario of the first embodiment;
FIG. 13 is a diagram of slots and subframes according to a sixth scenario of the first embodiment;
FIG. 14 is a diagram of slots and subframes according to a seventh scenario of the first embodiment;
FIG. 16 is a diagram of slots and subframes according to a second scenario of the second embodiment;
FIG. 17 is a diagram of slots and subframes according to a third scenario of the second embodiment;
FIG. 18 is a diagram of slots and subframes according to a fourth scenario of the second embodiment;
FIG. 19 is a diagram of slots and subframes according to a fifth scenario of the second embodiment;
FIG. 20 is a diagram of slots and subframes according to a sixth scenario of the second embodiment;
FIG. 21 is a diagram of slots and subframes according to a seventh scenario of the second embodiment;
FIG. 22 is a diagram of slots and subframes according to a first variant of a third embodiment;

FIG. 23 is a diagram of slots and subframes according to a second variant of the third embodiment; and FIG. 24 is a diagram of slots and subframes according to a third variant of the third embodiment.

DETAILED DESCRIPTION

Figure 2:
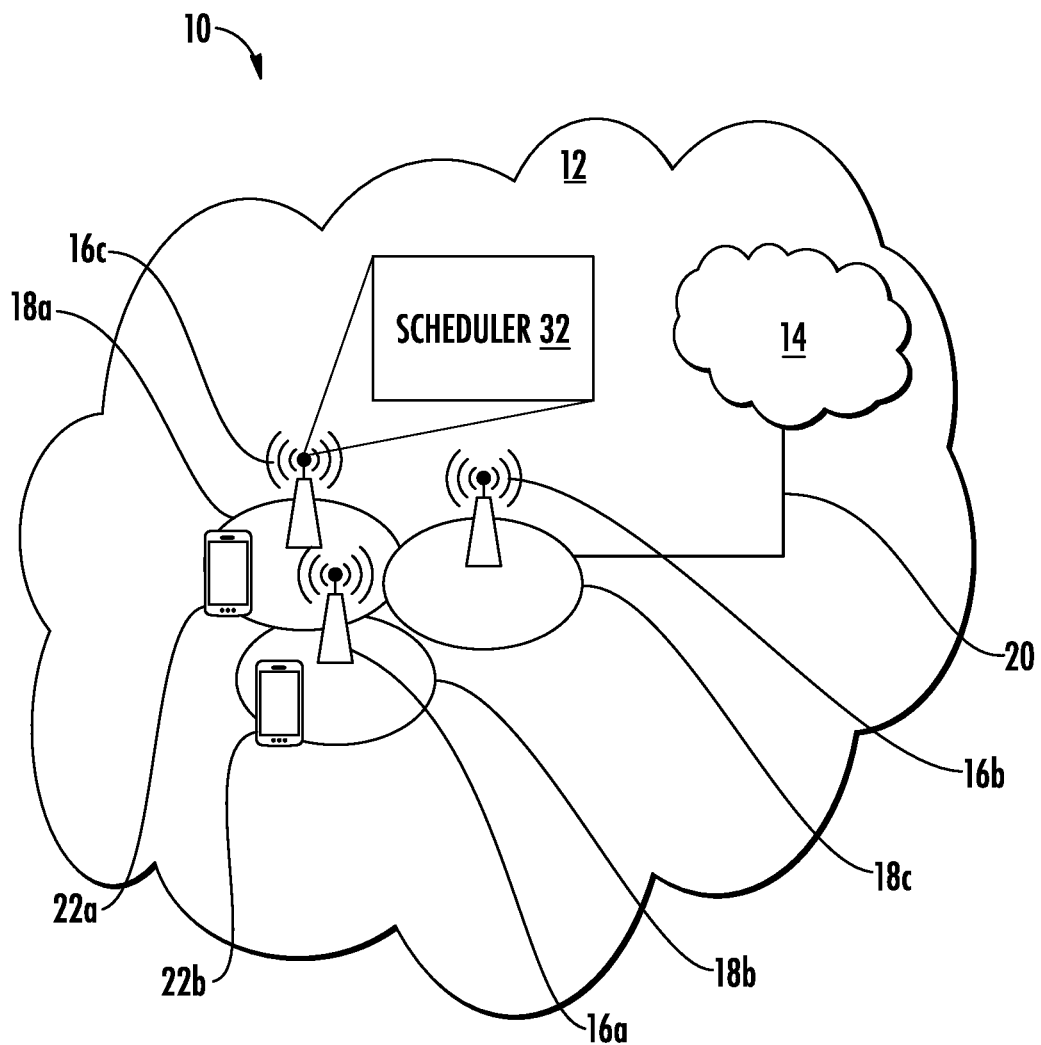
FIG. 2 is a schematic diagram of an exemplary network architecture illustrating a communication system according to the principles in the present disclosure.

Before describing in detail exemplary embodiments, it is noted that the embodiments reside primarily in combinations of apparatus components and processing steps related to dual-connectivity single uplink (UL) schemes. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, integrated access and backhaul (IAB) node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

An advantage of using dual connectivity is to ensure good coverage for signaling and at the same time being able to use the full capacity on the NR leg. A typical configuration is to use a low frequency on the LTE side to ensure good coverage and to use a high frequency of the NR leg but with wider bandwidth to achieve high capacity on the NR leg. With such a configuration, one embodiment may ensure that the WD will still be able to keep good coverage on the LTE leg and at the same time be able to utilize the full capacity on the NR leg when available. As the following example shows, the degradation in DL and UL capacity compared with using full aggregation is in many cases not that large:

Assume a 20 MHz LTE bandwidth at a low frequency using FDD. Assume also a 100 MHz NR bandwidth at a high frequency using TDD, where the TDD pattern has 75% of slots being allocated to downlink (DL) and 25% of slots are allocated to uplink (UL). An approximate estimation of the ratio of the total DL capacity available for the case of single WD connected to the network node with the EN-DC WD pattern described herein compared with full DL aggregation would then be:

$$(0.5*20\text{ MHz} + 0.75*100\text{ MHz})/(20\text{ MHz} + 0.75*100\text{ MHz}) = 89\%$$

An approximate estimation of the ratio of the total uplink (UL) capacity available with an EN-DC WD pattern described herein as compared with full UL aggregation would then be:

$$(0.5*20\text{ MHz} + 0.25*100\text{ MHz})/(20\text{ MHz} + 0.25*100\text{ MHz}) = 77\%$$

As will be described hereafter, when there is more than one WD connected to the network node, the above ratios can approach 100% for both DL and UL.

Returning now to the drawing figures, in which like elements are referred to by like reference numerals, there is shown in FIG. 2 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

A network node 16 is configured to include a scheduler 32 which is configured to schedule uplink and downlink signals such that a first set of WDs are operable to receive downlink signals according to a first pattern and to transmit uplink signals according to a second pattern.

Example implementations, in accordance with an embodiment, of the WD 22, and network node 16 discussed in the preceding paragraphs will now be described with reference to FIG. 3.

The communication system 10 includes a network node 16 provided in a communication system 10 and including hardware 38 enabling it to communicate with the WD 22. The hardware 38 may include a radio interface 42 for setting up and maintaining at least a wireless connection 46 with a WD 22 located in a coverage area 18 served by the network node 16. The radio interface 42 may be formed as or may include, for example, one or more RF transmitters, one or more RF receivers, and/or one or more RF transceivers. It is also understood that the network node 16 may include one or more wired communication interfaces, e.g., copper and/or fiber optic.

In the embodiment shown, the hardware 38 of the network node 16 further includes processing circuitry 48. The processing circuitry 48 may include a processor 50 and a memory 52. In particular, in addition to or instead of a processor, such as a central processing unit, and memory, the processing circuitry 48 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 50 may be configured to access (e.g., write to and/or read from) the memory 52, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 44 stored internally in, for example, memory 52, or stored in external memory (e.g., database, storage array, network storage device, etc.) accessible by the network node 16 via an external connection. The software 44 may be executable by the processing circuitry 48. The processing circuitry 48 may be configured to control any of the methods and/or processes described herein and/or to cause such methods, and/or processes to be performed, e.g., by network node 16. Processor 50 corresponds to one or more processors 50 for performing network node 16 functions described herein. The memory 52 is configured to store data, programmatic software code and/or other information described herein. In some embodiments, the software 44 may include instructions that, when executed by the processor 50 and/or processing circuitry 48, causes the processor 50 and/or processing circuitry 48 to perform the processes described herein with respect to network node 16. For example, processing circuitry 48 of the network node 16 may include the scheduler 32 which is configured to schedule uplink and downlink signals such that a first set of WDs are operable to receive downlink signals according to a first pattern and to transmit uplink signals according to a second pattern.

The communication system 10 further includes the WD 22 already referred to. The WD 22 may have hardware 60 that may include a radio interface 62 configured to set up and maintain a wireless connection 46 with a network node 16 serving a coverage area 18 in which the WD 22 is currently located. The radio interface 62 may be formed as or may include, for example, one or more RF transmitters, one or more RF receivers, and/or one or more RF transceivers.

The hardware 60 of the WD 22 further includes processing circuitry 64. The processing circuitry 64 may include a processor 66 and memory 68. In particular, in addition to or instead of a processor, such as a central processing unit, and memory, the processing circuitry 64 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 66 may be configured to access (e.g., write to and/or read from) memory 68, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 70, which is stored in, for example, memory 68 at the WD 22, or stored in external memory (e.g., database, storage array, network storage device, etc.) accessible by the WD 22. The software 70 may be executable by the processing circuitry 64. The software 70 may include a client application 72. The client application 72 may be operable to provide a service to a human or non-human user via the WD 22.

The processing circuitry 64 may be configured to control any of the methods and/or processes described herein and/or to cause such methods, and/or processes to be performed, e.g., by WD 22. The processor 66 corresponds to one or more processors 66 for performing WD 22 functions described herein. The WD 22 includes memory 68 that is configured to store data, programmatic software code and/or other information described herein. In some embodiments, the software 70 and/or the client application 72 may include instructions that, when executed by the processor 66 and/or processing circuitry 64, causes the processor 66 and/or processing circuitry 64 to perform the processes described herein with respect to WD 22.

Figure 3:
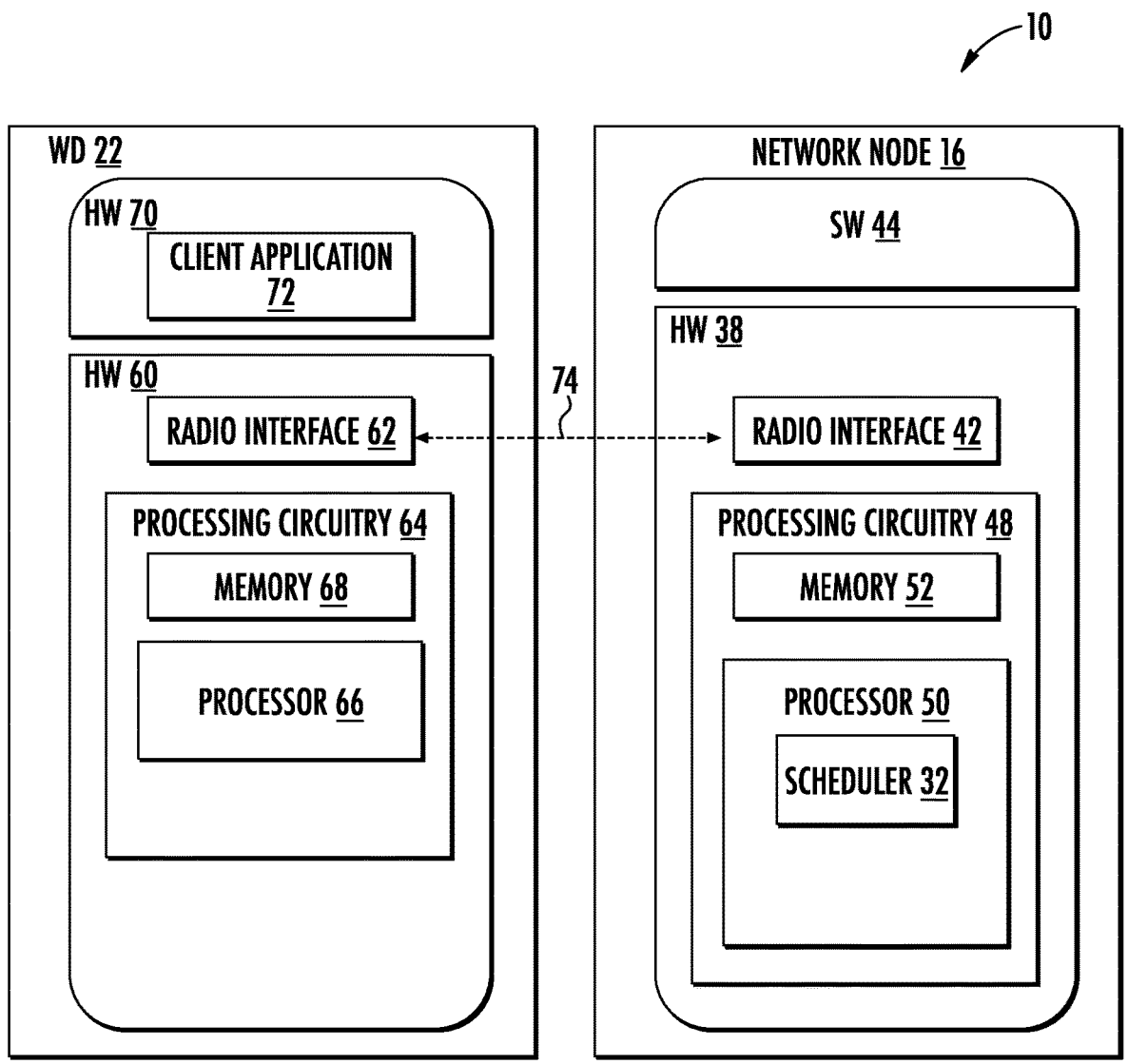
FIG. 3 is a block diagram of a network node in communication with a wireless device over a wireless connection according to some embodiments of the present disclosure.

In some embodiments, the inner workings of the network node 16 and WD 22 may be as shown in FIG. 3 and independently, the surrounding network topology may be that of FIG. 2.

The wireless connection 46 between the WD 22 and the network node 16 is in accordance with the teachings of the embodiments described throughout this disclosure. More precisely, the teachings of some of these embodiments may improve the data rate, latency, and/or power consumption and thereby provide benefits such as reduced user waiting time, relaxed restriction on file size, better responsiveness, extended battery lifetime, etc. In some embodiments, a measurement procedure may be provided for the purpose of monitoring data rate, latency and other factors on which the one or more embodiments improve.

Although FIGS. 2 and 3 show various units such as scheduler 32 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 4:
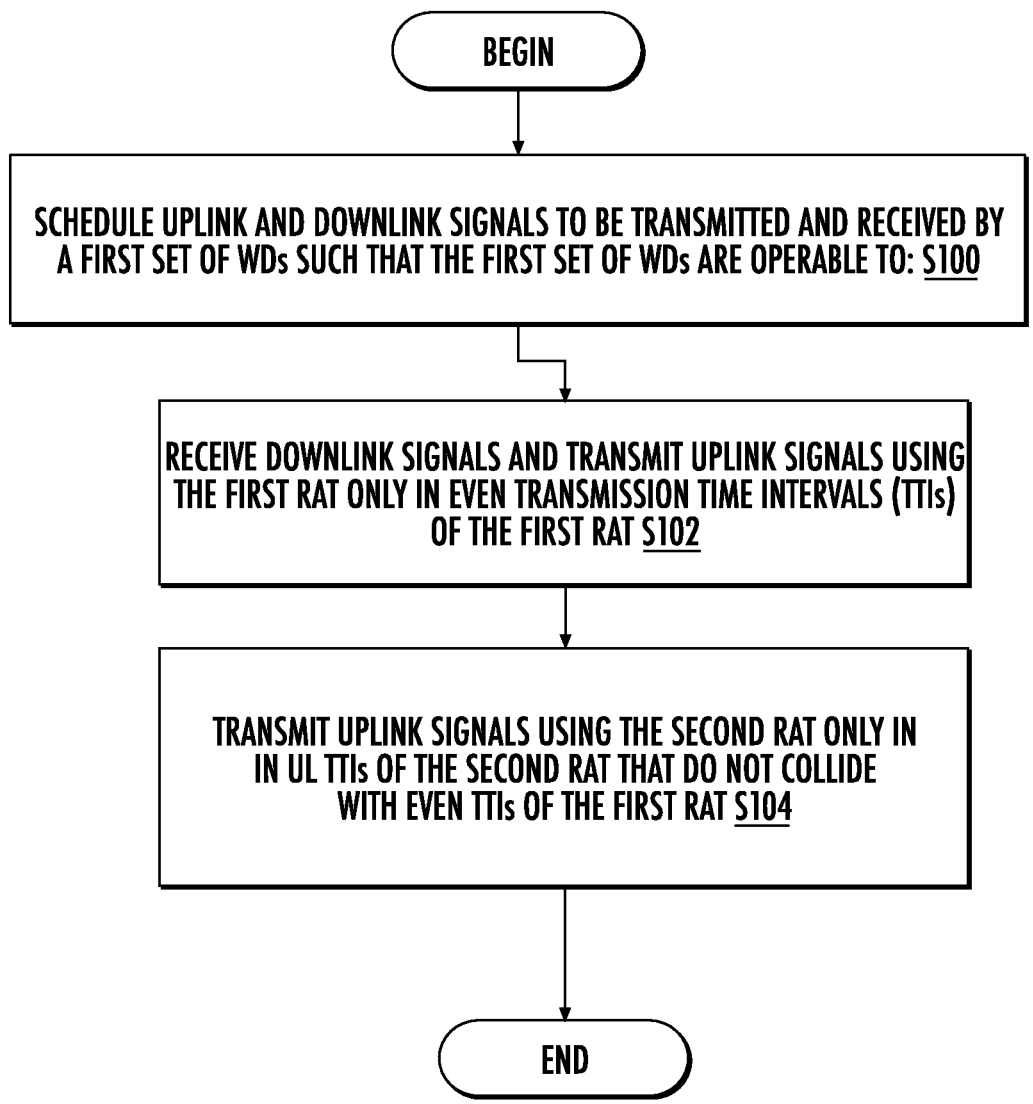
FIG. 4 is a flowchart of an exemplary process in a network node having dual connectivity functionality according to some embodiments of the present disclosure.

FIG. 4 is a flowchart of an exemplary process in a network node 16 for use in a dual connectivity mode to communicate with wireless devices, WDs, according to a first radio access technology, RAT, and to communicate with WDs according to a second RAT. One or more blocks described herein may be performed by one or more elements of network node 16 such as by one or more of processing circuitry 48 (including the scheduler 32), processor 50 and radio interface 62. Network node 16 such as via processing circuitry 48 and/or processor 50 and/or radio interface 62 is configured to schedule uplink and downlink signals to be transmitted and received by a first set of WDs such that the first set of WDs 22 are operable as follows (Block S100): receive downlink signals and transmit uplink signals using the first RAT only in even Transmission Time Intervals (TTIs) of the first RAT (Block S102); and transmit uplink signals using the second RAT only in in UL slots of the second RAT that do not collide with even TTIs of the first RAT (Block S104).

Figure 5:
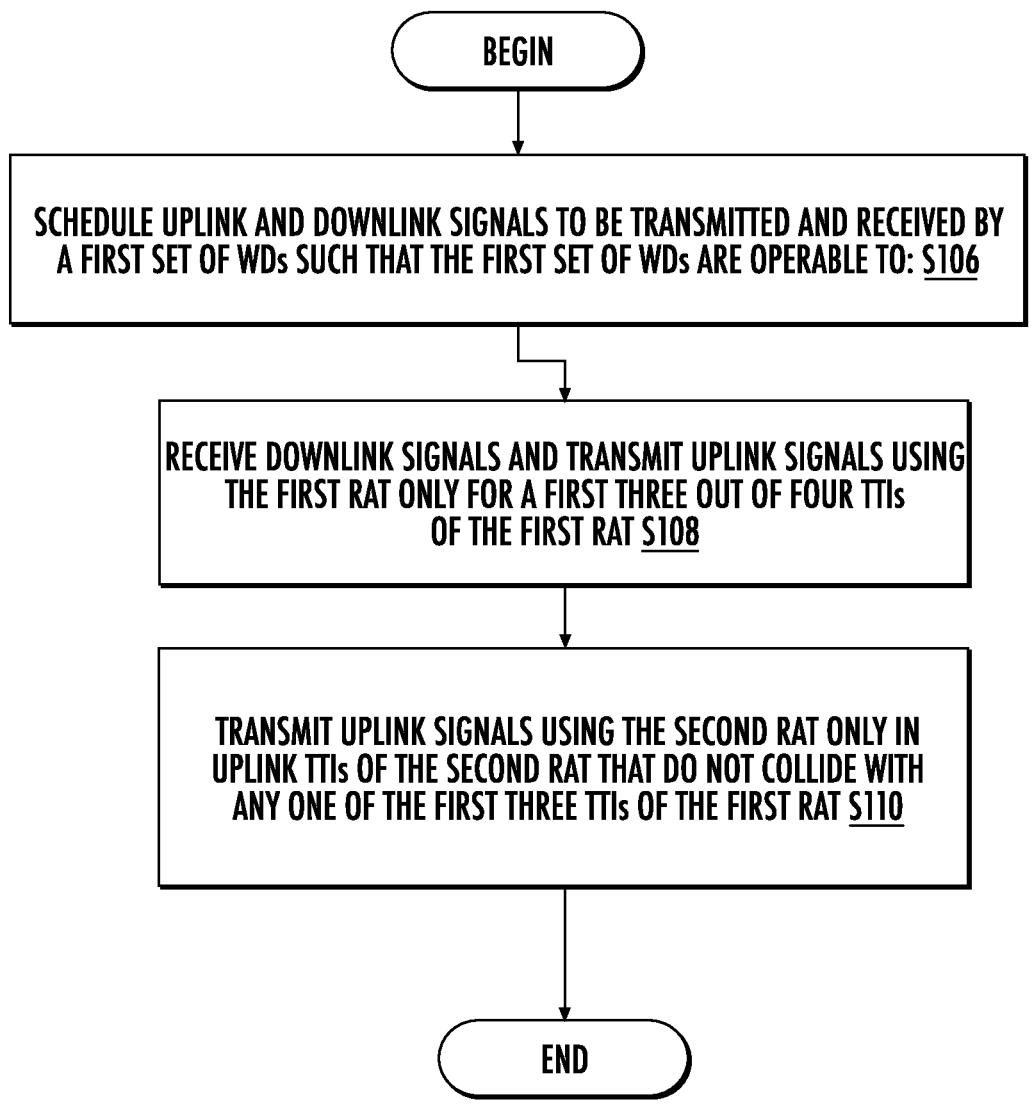
FIG. 5 is a flowchart of an alternative exemplary process in a network node having dual connectivity functionality according to some embodiments of the present disclosure.

FIG. 5 is a flowchart of an alternative exemplary process in a network node 16 for use in a dual connectivity mode to communicate with wireless devices, WDs, 22 according to a first radio access technology, RAT, and to communicate with WDs 22 according to a second RAT. The process includes scheduling uplink and downlink signals to be transmitted and received by a first set of WDs 22 such that the first set of WDs are operable to (Block S106): receive downlink signals and transmit uplink signals using the first RAT only for a first three out of four TTIs of the first RAT (Block S108); and transmit uplink signals using the second RAT only in uplink TTI of the second RAT that do not collide with any one of the first three TTIs of the first RAT (Block S110). For LTE, a TTI can correspond to one subframe spanning 1 msec. For NR, different TTI durations can be defined when using different number of symbols (e.g., corresponding to a mini-slot, one slot or several slots in one transmission direction). See 3GPP Technical Release (TR) 38.804 V14.0.0 (2017 March).

Having described the general process flow of arrangements of the disclosure and having provided examples of hardware and software arrangements for implementing the processes and functions of the disclosure, the sections below provide details and examples of arrangements for dual-connectivity single uplink (UL) schemes.

To facilitate the presentation, EN-DC, where LTE is the master RAT, EPC is the core network, and NR is the secondary RAT, are assumed. However, the embodiments below are applicable to any configuration of LTE-NR DC where the simultaneous UL transmission can potentially introduce IMD on either LTE or NR or both. In fact, the embodiments below are also applicable to any scenario where simultaneous UL transmissions in different carriers can result in IMD or power sharing issues, which include LTE carrier aggregation, NR carrier aggregation, LTE dual connectivity, NR dual connectivity, and LTE-NR carrier aggregation. Thus, although reference is made to subframes, TTIs may be used instead of subframes.

Embodiment 1: Single UL Using Even-Odd Pattern

Some embodiments implement HARQ timing case 2 and do not require dynamic coordination between LTE and NR and does not require implementation change or RRC configuration of the WD, i.e., the embodiment can be implemented completely transparent to the WD 22. Some embodiments solve both IMD and power sharing problems. An even-odd TDD pattern may be implemented at the network side such that a subset of WDs will not transmit UL or DL in odd subframes in LTE and will not transmit UL in NR UL slots that collide with the even LTE subframes. When allocating periodic uplink signals to these WDs 22 in LTE in advance, such as scheduling requests (SRs), physical uplink control channel (PUCCH) channel quality indicator (CQI) resources, sounding reference signal (SRS), or semi-presentient UL physical uplink shared channel (PUSCH) grants, the scheduler can ensure that the period and the offset of such UL signals are chosen such that these periodic signals occur in even subframes. Similarly, another subset of WDs 22 will not transmit in the UL or DL in even subframes in LTE, and will not transmit in the UL in NR UL slots that collide with the odd LTE subframes. When allocating periodic uplink signals to these WDs in LTE in advance, such as SRs, PUCCH CQI resources, sounding reference signal (SRS), or semi-presentient UL PUSCH grants, the scheduler can ensure that the period and the offset of such UL signals are chosen such that these periodic signals occur in odd subframes.

To illustrate this embodiment, LTE MCG and TDD NR SCG are now considered. Assume that NR is configured with numerology 30 KHz, i.e., such that the NR slot will span 0.5 msec, in contrast to LTE which operates with numerology 15 KHz, with a subframe that spans 1 msec. Four different scenarios are considered, each with different NR TDD patterns. However, embodiments are not limited to the scenarios of any one or more examples, as any person skilled in the art can readily apply them to wider scenarios, e.g., different duplexing and different NR numerologies such as 15 KHz, 60 KHz, 120 KHz, etc.

To simplify the description of the patterns below, the following notations are adopted:

DL: Downlink LTE subframe or downlink NR slot;
UL: Uplink LTE subframe or uplink NR slot; and
S: Special LTE subframe or special NR slot. In LTE, a special subframe contains:
  Downlink pilot time slot (DwPTS), which can contain DL reference signals, DL data, and DL control data,
  Gap, and
  Uplink pilot time slot (UpPTS), which can contain SRS and short RACH.

In NR, configuration of the special slot is quite flexible, i.e., the orthogonal frequency division multiplexed (OFDM) symbols constituting the NR special slot can be either downlink, gap, or uplink OFDM symbols. One desirable configuration of the NR special slot is to configure the special slot to consist of DL OFDM symbols, followed by Gap OFDM symbols, and then UL OFDM symbols. This configuration does not only allow the WD's circuitry to shift from DL to UL, but also to achieve coexistence with the TDD patterns of the LTE. In this disclosure, no assumption is made as to how the NR special slot is configured.

Scenario I: FDD LTE, TDD NR with TDD Pattern [DL, DL, S, UL].

Although all subframes are available for DL and UL in frequency division duplex (FDD) LTE, only even subframes will be scheduled for an EN-DC WD 22 according to this embodiment, as shown in FIG. 6, where "X" denotes the subframes that will not be used for DL or UL. By doing so, the single-UL property may be maintained, i.e., the WD 22 will not be scheduled in UL LTE and UL NR at the same time. This property may be maintained as long as LTE and NR subframes/slots are aligned and there is no need for scheduling coordination between LTE eNB and NR gNB. The WD 22 does not need to be configured with such a pattern, i.e., this pattern may be applied only at the network side in a way transparent to the WD 22. This particular pattern satisfies LTE's FDD HARQ requirement. That is, if WD 22 transmits in DL in LTE subframe n, then LTE UL in subframe n+4 may be expected to be available for UL transmission, and vice versa.

It is noted that this embodiment is applied only to the WD 22 when it is configured with EN-DC. For instance, a WD 22 connected only to LTE may still use legacy FDD, i.e., it can potentially use all subframes for DL and UL. Hence, from a network perspective, there may be no loss of resources due to this embodiment as long there is sufficient traffic to be served by legacy LTE WDs not configured in EN-DC mode.

Scenario II: FDD LTE, TDD NR with TDD Pattern [DL, DL, DL, S, UL]

Figure 8:
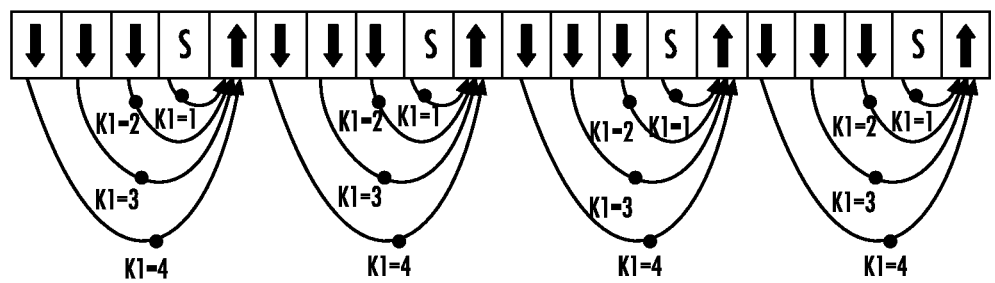
FIG. 8 is a first HARQ pattern.
Figure 9:
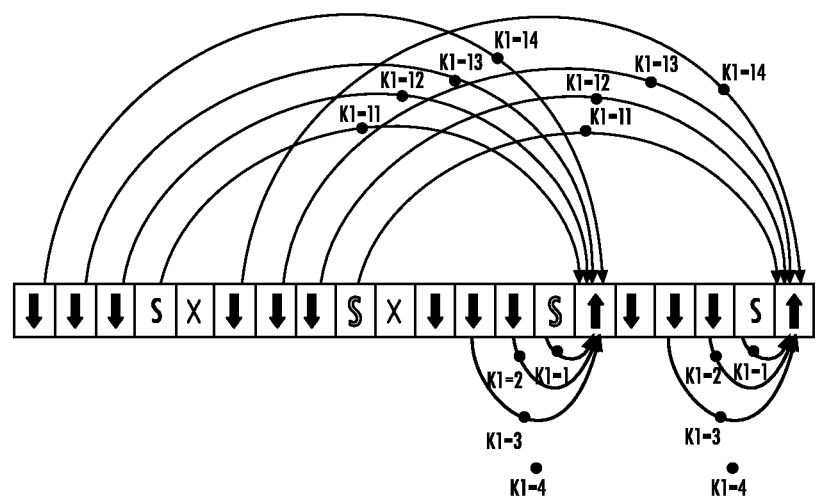
FIG. 9 is a second HARQ pattern.

Unlike the previous case where all available NR UL slots can be used, in this case, some NR UL slots will not be used to maintain the single-UL property, as shown in FIG. 7. Unlike LTE, NR's HARQ timing is flexible and indeed configurable. In particular, NR's standard specifies K1, defined as the time gap in slots between physical downlink shared channel (PDSCH) transmission and the reception HARQ ACK, which can range from 0 to 15. During RRC configuration, the WD 22 may be configured with up to 8 possible K1 values, and the downlink control information (DCI) carrying the DL assignment may also carry an indication of the selected K1 (out of the 8 K1 configured) to be used when sending the HARQ ACK for the corresponding DL assignment. By utilizing such flexibility, it is possible to establish HARQ timing that is applicable to the patterns in FIG. 7. In particular, by configuring the following K1 values in RRC {1, 2, 3, 4, 11, 12, 13, 14}, it is possible to carry the HARQ feedback for all DL NR slots without the need to use the restricted UL slots (the ones marked with "X" in FIG. 7), as shown in FIG. 8 (legacy pattern) and FIG. 9 (pattern disclosed herein). Note that this is only one possible way to achieve HARQ timing for NR for this TDD pattern; other ways are also possible.

As shown in FIG. 7, two possible patterns are possible for EN-DC WDs to satisfy the single-UL property. By configuring a subset of EN-DC WDs 22 with pattern 1 and the other subset with pattern 2, the network will utilize all UL and DL slots in both LTE and NR, as long there is sufficient traffic from both subsets of EN-DC WDs. Similarly, if there are WDs 22 that use LTE-only or NR-only, then the network will utilize all UL and DL slots in both in LTE and NR, as long there is sufficient traffic for these WDs 22. A possible downside of this embodiment may be: that the WD's 22 peak throughput may be potentially decreased, when for instance only a single user is connected to the network and the additional latency arising from delay of the HARQ feedback.

Scenario III: FDD LTE, TDD NR with TDD Pattern [DL, DL, DL, S, UL, DL, DL, S, UL, UL].

An embodiment for this case is illustrated in FIG. 10. Although it has a different pattern, this case resembles the case in Scenario II, and the same approach used for NR HARQ timing can also be used here.

Scenario IV: FDD LTE, TDD NR with TDD Pattern [DL, DL, DL, DL, UL, UL, DL, DL, DL, DL]

The embodiment for this case is illustrated in FIG. 11. This case resembles the case in Scenario II with an important difference. In this scenario, in order to preserve the single-UL property, 3 DL NR slots (e.g., slots 16, 17, 18, for NE-DC WD Pattern 1) will be restricted since the 3 DL NR slots might require a value of K1 that is larger than 15 which is not currently supported in 3GPP Release 15. Such restriction might be relaxed in future NR releases.

Scenario V: TDD LTE with TDD Config 2, TDD NR with TDD Pattern [DL, DL, DL, S, UL, UL, DL, DL, DL, DL]

The embodiment for this case is illustrated in FIG. 12. This case resembles the case in Scenario IV, with an important difference. In LTE, when an UL subframe is restricted, then multiple DL subframes will be restricted as one UL subframe carries the HARQ feedback for more than one DL subframe. In this scenario, the WD 22 is assumed not to be able to support simultaneous UL/DL operation and that is why the NR TDD pattern is chosen to align with the LTE pattern.

In some embodiments, special subframes in LTE and NR do not contain conflicting duplexing, e.g., LTE DwPTS, if used for downlink transmission, should not collide with uplink OFDM symbols in NR.

Scenario VI: TDD LTE with TDD Config 1, TDD NR with TDD Pattern [DL, DL, S, UL]

In this configuration, it is assumed that the WD is able to perform simultaneous UL LTE and DL NR as well as simulation DL LTE and UL NR. This pattern is shown in FIG. 13.

Scenario VII: TDD LTE with TDD Config 2, TDD NR with TDD Pattern [DL, DL, S, UL]

In this configuration, it is assumed that the WD is able to perform simultaneous UL LTE and DL NR as well as simulation DL LTE and UL NR. This pattern is shown in FIG. 14.

Embodiment 2: Relaxed Single Uplink

Unlike Embodiment 1, where the single-UL property is strictly enforced, in this embodiment the single-UL property is relaxed for physical uplink control channel (PUCCH) transmission carrying HARQ feedback. In particular, in this embodiment, the UL PUCCH in LTE may be transmitted simultaneously with any UL signal in NR, and the UL PUCCH in NR may be transmitted simultaneously with any UL signal in LTE. The concepts from embodiment 1 are reused to avoid simultaneous UL transmissions for channels other than PUCCH carrying HARQ feedback, e.g., PUSCH, SRS, SR, and PUCCH carrying a channel state information (CSI) report. A rationale behind this embodiment is that a PUCCH carrying HARQ feedback can be transmitted with much lower power as it contains only a small number of bits. Thus, the impact on power sharing or IMD is smaller than UL PUSCH transmission. The HARQ timing for NR does not need to be changed as for the case in the previous embodiment.

To illustrate this embodiment, FDD LTE MCG and TDD NR SCG are considered. Further assume NR is configured with numerology 30 KHz, i.e., NR's slot will span 0.5 msec, in contrast to LTE which is operating with numerology 15 KHz and with its subframe spanning 1 msec. Consider different scenarios, with different NR's TDD patterns. Note that this embodiment is applicable to wider scenarios than presented herein.

Figure 15:
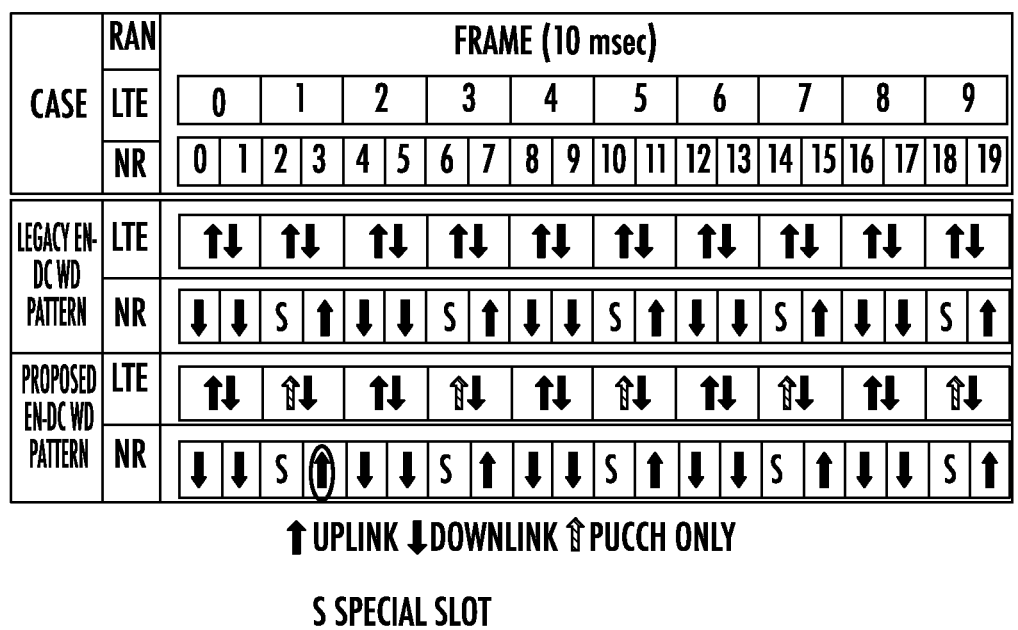
FIG. 15 is a diagram of slots and subframes according to a first scenario of a second embodiment.

Scenario I: NR's TDD Pattern [DL, DL, S, UL]
This scenario is shown in FIG. 15.
Scenario II: NR's TDD Pattern [DL, DL, DL, S, UL]
This scenario is shown in FIG. 16.
Scenario III: NR's TDD Pattern [DL, DL, DL, S, UL, DL, DL, S, UL, UL]
This scenario is shown in FIG. 17.
Scenario IV: NR's TDD Pattern [DL, DL, DL, S, UL, UL, DL, DL, DL, DL]
This scenario is shown in FIG. 18.
Scenario V: NR's TDD Pattern [DL, DL, DL, DL, DL, DL, DL, S, UL, UL]
This scenario is shown in FIG. 19.
Scenario VI: TDD LTE with TDD Configuration 1; NR's TDD Pattern [DL, DL, S, UL]
This scenario is shown in FIG. 20. In this configuration, it is assumed that the WD is able to perform simultaneous UL LTE and DL NR as well as simulation DL LTE and UL NR.
Scenario VII: TDD LTE with TDD Configuration 2; NR's TDD Pattern [DL, DL, S, UL]

This scenario is shown in FIG. 21. In this configuration, it is assumed that the WD is able to perform simultaneous UL LTE and DL NR as well as simulation DL LTE and UL NR.

Embodiment 3: Avoiding Harmonics

In this embodiment, at least partial avoidance of both IMD and harmonics is achieved for the case of FDD LTE and TDD NR with TDD pattern 3DL:S:1UL. However, extension to other duplexing configurations is straightforward. The following notations are adopted.

Restricted Downlink: downlink is allowed only in parts of the band where no or low interference is expected from harmonics that can be produced from any part of the used uplink band; and Restricted Uplink: uplink is allowed only in parts of the band where no or low harmonics interference is expected to be generated that can harm any part of the used downlink band.

Although the term "harmonics" is used, in most of the cases, only one or the first few harmonics may be considered as they cause the most interferences, e.g., only $2^{nd}$ harmonics might be of concern. Also, depending on the band combination and channel allocation, only one or very few harmonics may be present. Note that reference to "low" interference is a reference to interference that is low enough to achieve the desired quality of service.

In FIG. 22, DL NR is restricted due to harmonics. In FIG. 23, a variant of the embodiment of FIG. 22 is shown, where both UL LTE and DL NR are restricted due to harmonics. Other variants are possible and straight forward to construct. Similar to FIG. 21, in FIG. 24, DL NR is restricted due to harmonics, but consider relaxed single-UL, i.e., PUCCH in one radio access technology (RAT) is allowed to collide with UL transmission in another RAT. In some embodiments, interference from harmonics may be compared to a threshold to determine if the interference is not low enough to justify restricting downlink signal. In some embodiments, the threshold may be set by the operator to maintain a particular quality of service.

Embodiment 4: Per RB Implementation

In this embodiment, embodiments 1, 2, or 3 are implemented per-resource block (RB) basis, so that a pattern is specified for each RB. An advantage of this embodiment is to have the avoidance scheme described in the embodiments above activated only for the RBs that produce or get impacted by IMD and/or harmonics. Thus, this embodiment results in smaller loss of peak user throughput.

Embodiment 5: One-In-Four Pattern

In previous embodiments, multiples cases for even-odd patterns where every other subframe is used for DL and UL in LTE were discussed. In this embodiment, the pattern can be modified so that only every $4^{th}$ subframe is used in LTE. By doing so, the strict HARQ timing of LTE is still maintained. This pattern may be useful when it is desired to achieve much higher peak throughput in NR compared to LTE as the pattern sacrifices more LTE subframes to free more NR slots.

Embodiment 6: Activation

In this embodiment, Embodiments 1, 2, 3, 4 and/or 5 are activated based on one or more of the following conditions or characteristics of the WD:

If the WD has indicated that it only supports Single Uplink Operation (SUO);

If the band combinations are difficult band combinations that are known to cause significant IMD and/or harmonics when simultaneous UL LTE and NR occur;

When the WD's 22 signal to interference plus noise ratio (SINR) (or reference signal received power (RSRP), reference signal received quality (RSRQ)) is less than a configurable threshold, in either LTE or NR or both;

When the WD's power headroom is less than a configurable threshold, in either LTE or NR or both;

When the WD's 22 DL packet data convergence protocol (PDCP) buffer is greater than a threshold;

When the WD's 22 traffic belongs to a subset of preconfigured type of traffic, e.g., voice over LTE (VoLTE), voice over New Radio (VoNR), etc.; and/or When the WD 22 belongs to a subset of privileged WD's group.

The network can activate this configuration without the need to signal any information to the WD 22, and once activation is completed the network will schedule the WD 22 on the LTE and NR legs when applicable according to the correspond patterns described above, and hence HARQ case 2 is enabled. Infrequent coordination between LTE and NR is required in this case so they synchronize the TDD patterns to be used by LTE and NR.

One way to perform this kind of coordination between the LTE node and the NR node in a dual connectivity configuration is to use any of the X2 standard messages: secondary g-node-B (SgNB) Addition Request, SgNB Addition Request Acknowledge, SgNB Modification Request, SgNB Modification Request Acknowledge, SgNB Modification Required, and SgNB Modification Confirm (described in Technical Standard 36.423). These messages support the "MeNB Resource Coordination Information" and the "SgNB Resource Coordination Information" information elements, and by using these information elements the sender node can request the receiver node to learn which subframes it may not use for UL or DL transmission.

Since coordination between the two nodes in a dual connectivity configuration may be required in some embodiments, specification of which subframes that may be not be used for UL or DL traffic are indicated and the messages described in the previous paragraph are very suitable for handling this coordination.

Embodiment 7: Deactivation

In this embodiment, embodiments 1, 2, 3, 4 and/or 5 are deactivated based on one or more of the following conditions or characteristics of the WD 22:

When the WD's 22 SINR (or RSRP, RSRQ) is greater than a configurable threshold, in either LTE or NR or both;

When the WD's power headroom is greater than a configurable threshold, in either LTE or NR or both;

When the WD's 22 traffic belongs to a subset of preconfigured type of traffic, e.g., VoLTE, VoNR, etc.; and When the WD 22 belong to a subset of privileged WD's group.

The network can deactivate this configuration without the need to signal any information to the WD 22, and once deactivation is completed the network will schedule the WD 22 on both the LTE leg and the NR leg without the restrictions setup by the patterns in this invention (hence release HARQ case 2). Infrequent coordination between LTE&NR is required in this case so they synchronize the TDD pattern to be used by LTE&NR (in this case, default patterns are used). One way to perform this kind of coordination is as described above with reference to Embodiment 6.

Since coordination between the two nodes in a dual connectivity configuration may be required in some embodiments, specification of which subframes that may be not be used for UL or DL traffic are indicated and the messages described in the previous paragraph are very suitable for handling this coordination.

Thus, according to one aspect, a method in a network node 16 for use in a dual connectivity mode to communicate with wireless devices, WDs, 22 according to a first radio access technology, RAT, and to communicate with WDs 22 according to a second RAT is provided. The method includes scheduling uplink and downlink signals to be transmitted and received by a first set of WDs 22 such that the first set of WDs are operable to: receive downlink signals and transmit uplink signals using the first RAT only in even Transmission Time Intervals (TTIs) of the first RAT; and transmit uplink signals using the second RAT only in in UL TTIs of the second RAT that do not collide with even TTIs of the first RAT.

According to this aspect, in some embodiments, the first RAT is Long Term Evolution, LTE, and the second RAT is New Radio, NR. In some embodiments, a first group of WDs 22 is scheduled according to a first pattern for uplink and downlink signaling and a second group of WDs 22 is scheduled according to a second pattern for uplink and downlink signaling different from the first pattern. In some embodiments, the method further includes configuring a WD 22 by radio resource control, RRC, signaling with up to N possible K1 values, N being an integer and K1 defined as a time gap in TTIs between a physical downlink shared channel, PDSCH, transmission and a reception hybrid automatic repeat request, HARQ, acknowledgment, ACK. In some embodiments, the method further includes restricting slots of the second RAT to have three consecutive TTIs with neither downlink nor uplink transmission. In some embodiments, at least one TTIs are prevented from being used for downlink or uplink signaling to avoid K1>15, K1 being defined as a time gap in units of slots between a physical downlink shared channel, PDSCH, transmission and a reception hybrid automatic repeat request, HARQ, acknowledgment, ACK. In some embodiments, an uplink signal using the second RAT is not configured when a WD 22 is not scheduled in a TTI that overlaps another TTI, where a WD is not configured with a sounding reference signal of the first RAT. In some embodiments, uplink signals on the first RAT in odd TTIs are restricted to physical uplink control channel, PUCCH, only. In some embodiments, the method includes restricting downlink signaling to only parts of a frequency band where interference lower than a threshold is expected from harmonics produced from any part of a used uplink frequency band. In some embodiments, the method includes restricting uplink signaling to only parts of a frequency band where low harmonic interference is expected to be generated that can harm any part of the used downlink frequency band. In some embodiments, the scheduling is applied per resource block. In some embodiments, the scheduling is activated based at least in part on a characteristic or condition of a WD. In some embodiments, the scheduling is deactivated based at least in part on a characteristic or condition of a WD.

According to another aspect, a network node 16 for use in a dual connectivity mode to communicate with wireless devices, WDs, 22 according to a first radio access technology, RAT, and to communicate with WDs 22 according to a second RAT, the network node 16 comprising processing circuitry 48 configured to: schedule uplink and downlink signals to be transmitted and received by a first set of WDs such that the first set of WDs 22 are operable to: receive downlink signals and transmit uplink signals using the first RAT only in even Transmission Time Intervals (TTIs) of the first RAT; and transmit uplink signals using the second RAT only in in UL slots of the second RAT that do not collide with even TTIs of the first RAT.

According to this aspect, in some embodiments, the first RAT is Long Term Evolution, LTE, and the second RAT is New Radio, NR. In some embodiments, a first group of WDs 22 is scheduled with a first pattern for uplink and downlink signaling and a second group of WDs 22 is scheduled with a second pattern for uplink and downlink signaling different from the first pattern. In some embodiments, the processing circuitry is further configured to configure a WD 22 by radio resource control, RRC, signaling with up to 8 possible K1 values, K1 defined as a time gap in slots between a physical downlink shared channel, PDSCH, transmission and a reception hybrid automatic repeat request, HARQ, acknowledgment, ACK. In some embodiments, the processing circuitry is further configured to restrict downlink slots of the second RAT to produce three consecutive slots with neither downlink nor uplink transmission. In some embodiments, at least one subframes are prevented from being used for downlink or uplink signaling to avoid K1>15, K1 being defined as a time gap in units of slots between a physical downlink shared channel, PDSCH, transmission and a reception hybrid automatic repeat request, HARQ, acknowledgment, ACK. In some embodiments, an uplink signal using the second RAT is not configured when a WD 22 is not configured with a sounding reference signal of the first RAT in a first subframe. In some embodiments, uplink signals on the first RAT in odd subframes are restricted to physical uplink control channel, PUCCH, only. In some embodiments, the processing circuitry is further configured to restrict downlink signaling to only parts of a frequency band where low interference is expected from harmonics produces from any part of a used uplink frequency band. In some embodiments, the processing circuitry is further configured to restrict uplink signaling to only parts of a frequency band where low harmonic interference is expected to be generated that can harm any part of the used downlink frequency band. In some embodiments, the scheduling is applied per resource block. In some embodiments, the scheduling is activated based at least in part on a characteristic of a WD. In some embodiments, the scheduling is deactivated based at least in part on a characteristic of a WD.

According to yet another aspect, a method in a network node 16 for use in a dual connectivity mode to communicate with wireless devices, WDs, 22 according to a first radio access technology, RAT, and to communicate with WDs 22 according to a second RAT is provided. The method includes scheduling uplink and downlink signals to be transmitted and received by a first set of WDs 22 such that the first set of WDs 22 are operable to: receive downlink signals and transmit uplink signals using the first RAT only for a first three out of four subframes of the first RAT; and transmit uplink signals using the second RAT only in uplink slots of the second RAT that do not collide with any one of the first three subframes of the first RAT.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
|---|---|
| EN-DC | E-UTRA - NR Dual Connectivity |
| HARQ | Hybrid automatic request control |
| IMD | Intermodulation distortion |
| LTE | Long-term evolution |
| NR | Next Radio |
| TDD | Time-division duplexing |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method in a network node for use in a dual connectivity mode to communicate with wireless devices (WDs) according to a first radio access technology (RAT) and to communicate with WDs according to a second RAT, the method comprising:
   scheduling uplink and downlink signals to be transmitted and received by a first set of WDs such that the first set of WDs are operable to:
      receive downlink signals and transmit uplink (UL) signals using the first RAT only in even Transmission Time Intervals (TTIs) of the first RAT, uplink signals on the first RAT in odd TTIs being restricted to physical uplink control channel (PUCCH) only; and
      transmit uplink signals using the second RAT only in in UL TTIs of the second RAT that do not collide with even TTIs of the first RAT.

2. The method of claim 1, wherein the first RAT is Long Term Evolution (LTE) and the second RAT is New Radio (NR).

3. The method of claim 1, wherein a first group of WDs is scheduled according to a first pattern for uplink and downlink signaling and a second group of WDs is scheduled according to a second pattern for uplink and downlink signaling different from the first pattern.

4. The method of claim 1, further comprising configuring a WD by radio resource control (RRC) signaling with up to N possible K1 values, N being an integer and K1 defined as a time gap in TTIs between a physical downlink shared channel (PDSCH) transmission and a reception hybrid automatic repeat request (HARQ) acknowledgment (ACK).

5. The method of claim 1, further comprising restricting TTIs of the second RAT to have three consecutive TTIs with neither downlink nor uplink transmission.

6. The method of claim 1, wherein at least one or more TTIs are prevented from being used for downlink or uplink signaling to avoid K1>15, K1 being defined as a time gap in units of TTIs between a physical downlink shared channel (PDSCH) transmission and a reception hybrid automatic repeat request (HARQ) acknowledgment (ACK).

7. The method of claim 1, wherein an uplink signal using the second RAT is not scheduled in a TTI that overlaps with a TTI where a WD is configured with a sounding reference signal of the first RAT.

8. The method of claim 1, further comprising restricting downlink signaling to only parts of a frequency band where interference less than a threshold is expected from harmonics of a signal at a frequency in any part of a used uplink frequency band.

9. The method of claim 1, further comprising restricting uplink signaling to only parts of a frequency band where low harmonic interference is expected to be generated that can harm any part of the used downlink frequency band.

10. The method of claim 1, wherein the scheduling is applied per resource block.

11. The method of claim 1, wherein the scheduling is activated based at least in part on at least one of one or more characteristics and one or more conditions of a WD.

12. The method of claim 1, wherein the scheduling is deactivated based at least in part on at least one of one or more characteristics and one or more conditions of a WD.

13. A network node for use in a dual connectivity mode to communicate with wireless devices (WDs) according to a first radio access technology (RAT) and to communicate with WDs according to a second RAT, the network node comprising processing circuitry configured to:
   schedule uplink and downlink signals to be transmitted and received by a first set of WDs such that the first set of WDs are operable to:
      receive downlink signals and transmit uplink (UL) signals using the first RAT only in even Transmission Time Intervals (TTIs) of the first RAT, uplink signals on the first RAT in odd TTIs being restricted to physical uplink control channel (PUCCH) only; and
      transmit uplink signals using the second RAT only in in UL TTIs of the second RAT that do not collide with even TTIs of the first RAT.

14. The network node of claim 13, wherein the first RAT is Long Term Evolution (LTE) and the second RAT is New Radio (NR).

15. The network node of claim 13, wherein a first group of WDs is scheduled according to a first pattern for uplink and downlink signaling and a second group of WDs is scheduled with a second pattern for uplink and downlink signaling different from the first pattern.

16. The network node of claim 13, wherein the processing circuitry is further configured to configure a WD by radio resource control (RRC) signaling with up to 8 possible K1 values, K1 defined as a time gap in TTIs between a physical downlink shared channel (PDSCH) transmission and a reception hybrid automatic repeat request (HARQ) acknowledgment (ACK).

17. The network node of claim 13, wherein the processing circuitry is further configured to restrict downlink TTIs of the second RAT to produce three consecutive TTIs with neither downlink nor uplink transmission.

18. The network node of claim 13, wherein at least one or more TTIs are prevented from being used for downlink or uplink signaling to avoid K1>15, K1 being defined as a time gap in units of TTIs between a physical downlink shared channel (PDSCH), transmission and a reception hybrid automatic repeat request (HARQ) acknowledgment (ACK).

19. The network node of claim 13, wherein an uplink signal using the second RAT is not scheduled in a TTI that overlaps with another TTI where a WD is not configured with a sounding reference signal of the first RAT.

20. The network node of claim 13, wherein the processing circuitry is further configured to restrict downlink signaling to only parts of a frequency band where interference less than a threshold is expected from harmonics of a signal at a frequency in any part of a used uplink frequency band.

21. The network node of claim 13, wherein the processing circuitry is further configured to restrict uplink signaling to only parts of a frequency band where harmonic interference is expected to be generated that can harm any part of the used downlink frequency band.

22. The network node of claim 13, wherein the scheduling is applied per resource block.

23. The network node of claim 13, wherein the scheduling is activated based at least in part on at least one of one or more characteristics and one or more conditions of a WD.

24. The network node of claim 13, wherein the scheduling is deactivated based at least in part on at least one of one or more characteristics and one or more conditions of a WD.

25. A method in a network node for use in a dual connectivity mode to communicate with wireless devices (WDs) according to a first radio access technology (RAT) and to communicate with WDs according to a second RAT, the method comprising:

scheduling uplink and downlink signals to be transmitted and received by a first set of WDs such that the first set of WDs are operable to:

receive downlink signals and transmit uplink signals using the first RAT only for a first three out of four TTIs of the first RAT, uplink signals on the first RAT in odd TTIs being restricted to physical uplink control channel (PUCCH) only; and transmit uplink signals using the second RAT only in uplink TTIs of the second RAT that do not collide with any one of the first three TTIs of the first RAT.

* * * * *